United States Patent
Zimmermann et al.

(10) Patent No.: US 11,967,916 B2
(45) Date of Patent: Apr. 23, 2024

(54) LOAD CONTROL APPARATUS, AUTOMATION SYSTEM, ELECTRICAL LOAD, BUSBAR SYSTEM AND FUSE HOUSING

(71) Applicant: Future Systems Besitz GmbH, Rödental (DE)

(72) Inventors: Christian Zimmermann, Erlangen (DE); Bernhard Först, Kronach (DE)

(73) Assignee: Future Systems Besitz GmbH, Rödental (DE)

(*) Notice: Subject to any disclaimer, the term of this patent is extended or adjusted under 35 U.S.C. 154(b) by 404 days.

(21) Appl. No.: 17/431,931

(22) PCT Filed: Feb. 20, 2020

(86) PCT No.: PCT/EP2020/054553
§ 371 (c)(1),
(2) Date: Aug. 18, 2021

(87) PCT Pub. No.: WO2020/169774
PCT Pub. Date: Aug. 27, 2020

(65) Prior Publication Data
US 2022/0173585 A1    Jun. 2, 2022

(30) Foreign Application Priority Data
Feb. 22, 2019  (EP) .................................... 19158869

(51) Int. Cl.
*H02H 3/08*  (2006.01)
*H02H 1/00*  (2006.01)
(Continued)

(52) U.S. Cl.
CPC ......... *H02P 29/027* (2013.01); *H02H 1/0007* (2013.01); *H02H 3/05* (2013.01);
(Continued)

(58) Field of Classification Search
CPC .......... H02H 1/00; H02H 1/0007; H02H 3/05; H02H 3/08; H02H 3/093; H02H 3/44;
(Continued)

(56) References Cited

U.S. PATENT DOCUMENTS

| 4,345,292 A | 8/1982 | Jaeschke et al. |
| 6,304,472 B1 | 10/2001 | Nagasu et al. |

(Continued)

FOREIGN PATENT DOCUMENTS

| DE | 42 42 560 A1 | 7/1993 |
| DE | 11 2014 006 358 T5 | 10/2016 |

(Continued)

OTHER PUBLICATIONS

International Search Report corresponding to PCT Application No. PCT/EP2020/054553, dated May 27, 2020 (4 pages).

(Continued)

*Primary Examiner* — Tuan T Dinh
(74) *Attorney, Agent, or Firm* — Maginot, Moore & Beck, LLP

(57) ABSTRACT

A load control apparatus for controlling a power supply to an electrical load connected to an output terminal includes an overcurrent protection circuit having a power switch through which the electrical load receives a load current and a sensor component in series with the power switch that is configured to generate a voltage drop corresponding to the current rise speed of a load current from an input terminal to the output terminal. The protection circuit includes a driver circuit configured to detect an overcurrent depending on the voltage drop generated by the sensor component and/or at the power switch, and to switch off the power switch upon detection of an overcurrent within a switch-off period. The overcurrent protection circuit can include a power supply control circuit having a sensor component adapted to measure a supply (Continued)

voltage notified to a control unit of the load control apparatus adapted to control power supplied to the load.

27 Claims, 12 Drawing Sheets

(51) Int. Cl.
*H02H 3/05* (2006.01)
*H02H 3/093* (2006.01)
*H02H 7/08* (2006.01)
*H02H 7/12* (2006.01)
*H02H 7/122* (2006.01)
*H02H 7/22* (2006.01)
*H02P 23/14* (2006.01)
*H02P 29/024* (2016.01)

(52) U.S. Cl.
CPC ............. *H02H 3/08* (2013.01); *H02H 3/093* (2013.01); *H02H 7/08* (2013.01); *H02H 7/12* (2013.01); *H02H 7/1227* (2013.01); *H02H 7/222* (2013.01); *H02P 23/14* (2013.01)

(58) Field of Classification Search
CPC ............ H02H 3/445; H02H 7/08; H02H 7/12; H02H 7/1227; H02H 7/222; H02H 7/005; H02P 29/027; H02P 23/14
USPC ................ 361/93.1–93.8, 102–104; 318/445
See application file for complete search history.

(56) References Cited

U.S. PATENT DOCUMENTS

| | | | |
|---|---|---|---|
| 2004/0085697 A1* | 5/2004 | Kesler | F02P 3/051 |
| | | | 361/93.8 |
| 2005/0185353 A1* | 8/2005 | Rasmussen | H02M 1/44 |
| | | | 361/93.9 |
| 2005/0286181 A1 | 12/2005 | Ochiai | |
| 2008/0225562 A1* | 9/2008 | Mashra | H02J 9/062 |
| | | | 74/DIG. 9 |
| 2008/0288134 A1* | 11/2008 | Matsuo | F02D 41/221 |
| | | | 318/432 |
| 2009/0310270 A1 | 12/2009 | Burns et al. | |
| 2011/0085275 A1* | 4/2011 | Ohshima | H03K 17/0822 |
| | | | 361/93.7 |
| 2014/0354073 A1 | 12/2014 | Sadakata et al. | |
| 2017/0054285 A1* | 2/2017 | Jin | H02H 3/087 |
| 2017/0294774 A1 | 10/2017 | Illing et al. | |
| 2021/0328538 A1* | 10/2021 | Ichiki | H02P 29/027 |

FOREIGN PATENT DOCUMENTS

DE 10 2016 116 400 A1 3/2018
WO 2017/127012 A1 7/2017

OTHER PUBLICATIONS

Lim, S., "Small DFN Electronic Circuit Breaker Eliminates Sense Resistor," Linear Technology Magazine, May 2005, p. 25 (2 pages).

* cited by examiner

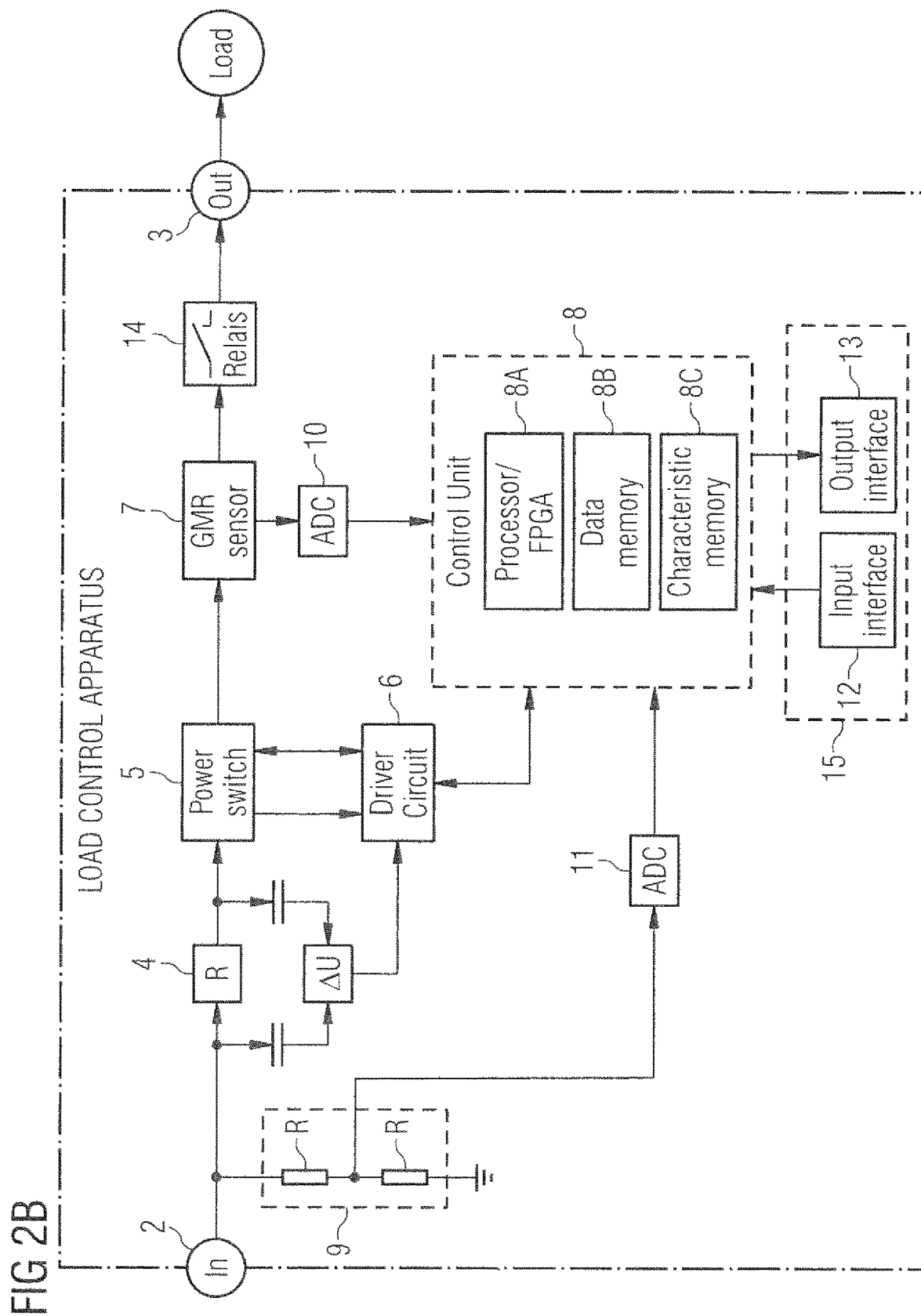

LOAD CONTROL APPARATUS, AUTOMATION SYSTEM, ELECTRICAL LOAD, BUSBAR SYSTEM AND FUSE HOUSING

PRIORITY CLAIM

This application is a U.S. National Stage of PCT/EP2020/054553, filed on Feb. 20, 2020, which claims priority to European patent application EP 19158869.8, filed on Feb. 22, 2019, the entire disclosures of which are incorporated herein by reference.

TECHNICAL FIELD

The invention relates to a method and apparatus for controlling a power supply to an electrical load.

TECHNICAL BACKGROUND

US 2009/0310270 A1 describes a fast-responding short circuit protection system with a self-reset for use in a circuit supplied by DC power. Between nodes, a switch is implemented by a field effector and an inductor are connected in series. The short circuit protection system includes a voltage sense coupled between the nodes for sensing voltage at a first node with respect to a second node. The voltage sense can be implemented as a voltage divider circuit. A controller compares the voltage at the second node as sensed by the voltage sense to the threshold voltage provided by a voltage trip level. The controller can be implemented by a comparator that can generate a control signal to open or close the switch. The voltage applied to the short circuit protection system is a DC voltage provided by a battery.

DE 11 2014 006 358 T5 discloses a controller connected via optical couplers to gate control circuits provided for semiconductor switches. Upon detection of an anomaly of an observed voltage, the gate control circuit is automatically switched off. The gate control circuit can use the voltage along coils for controlling the gate of an associated semiconductor switch.

U.S. Pat. No. 6,304,472 B1 describes an electric power converting system with an integrator providing an output indicative of an electrical current. The electric power converting system comprises a semiconductor switching element. Driving circuits are provided for turning on and off the semiconductor switching element. An integrating circuit is provided for integrating a voltage generated between both ends of an inductor for providing an output indicative of a current flowing through the inductor.

DE 10 2016 116 400 A1 describes a protection device having a current sensor element connected in series with a semiconductor switch between a first and a second terminal. The semiconductor switch is connected to a tripping circuit connected to a characteristic entity unit. The characteristic entity unit is adapted to determine an entity which does correlate with the temperature of a blocking layer within the semiconductor switch based on a current profile of a measured electrical current.

US 2014/0354073 A1 describes a power feed device of an inductive charging device. A power factor improvement circuit is adapted to improve a power factor of a commercial power supply.

US 2017/294774 A1 describes an electronic switching and protection circuit with a wake-up function. The control circuit comprises a driver circuit adapted to drive the electronic switch including at least one transistor. The circuit comprises an overcurrent protection circuit which receives a current measurement signal and compares the received current measurement signal with an overcurrent threshold.

US 2005/0286181 A1 describes a power supply apparatus which is capable of detecting an abnormality in an electrical current flowing in a drive circuit. The drive circuit is adapted to receive electrical power from a power supply to drive a load circuit. An abnormal current detection circuit is provided for detecting an abnormality in the drive current flowing in the drive circuit. This abnormal current detection circuit is adapted to detect that a current integral of the drive current is larger than a predetermined threshold to determine that the respective drive current is abnormal.

Electrical motors form loads which operate through the interaction between the motor's magnetic field and an electrical current in a wire winding to generate a mechanical force in form of a rotation of a shaft. Electrical motors in general can be powered by direct current sources such as batteries or rectifiers or by alternating current sources such as a power grid, an inverter or an electrical generator. There are different kinds of electrical motors, in particular asynchronous motors and synchronous motors. Loads, in particular electrical motors, connected to a power supply system require overload and/or overcurrent protection. In an electrical system, a situation may occur where an overcurrent flows through an electrical conductor leading to an excessive generation of heat and damaging the electrical equipment or load. The load can comprise a resistive load, a capacitive load or an inductive load such as an electrical motor. There can be many different causes for causing an overcurrent including short circuits, an incorrect circuit design or ground faults. Further, there exists a variety of conventional overcurrent protection devices such as fuses, electromechanical circuit breakers or solid-state power switches. Fuses do melt when an overcurrent occurs thus interrupting the electrical current and consequently protecting the connected load. However, fuses are melting only at relatively high current amplitudes so that much electrical energy can be transferred to the connected load such as an electrical motor before the fuse does melt. This increases the risk of damaging components of the connected electrical motor. Further, after the cause of the overcurrent has been cleared it is necessary to replace the affected fuse.

An electrical motor as a load can comprise a rated power. In electrical engineering, the power rating of an equipment is the highest power input allowed to flow through the respective equipment. Overcurrent protection protects electrical equipment against excessive currents or currents beyond the acceptable current ratings, which can result from short circuits, ground faults and overload conditions. In contrast, overload protection protects against a situation where overload current causes over-heating of the protected electrical equipment.

An overcurrent relay can be used as overload (thermal) protection to protect resistive loads. However, for inductive loads, the overcurrent relay cannot serve as overload protection. Overload relays usually have a longer time-setting than overcurrent relays.

Electrical protection devices can employ current sensors to measure an electrical current flowing to the connected load to detect a critical situation and to trigger automatically an electronic or electromechanical switch in case that a critical situation does arise. A current measurement element such as a Hall sensor may measure the electrical current and supply the measurement values to a controller or control logic which can switch off the switching component in case that the measured current exceeds a predetermined threshold value. Conventional protection sensors use semiconductor switches such as MOSFETs to protect connected loads against overcurrents. With increasing electrical currents flowing via the switched-on semiconductor switch, the voltage drop along the semiconductor switch does also increase so that there occurs a higher power loss at the semiconductor switch. Increasing power loss can cause damaging and even destruction of the semiconductor switch and/or electronic components within the connected electrical motor. Therefore, conventional protection circuits evaluate the voltage drop along its semiconductor switch and can switch off the semiconductor switch as soon as the voltage drop exceeds a threshold value. However, this conventional switch-off mechanism comes into operation only after the electrical current has already reached a high amplitude after a relatively long switch-off period. These conventional protection circuits work comparatively slow and require a high current level to trigger the respective switching component.

Accordingly, there is a need to provide an apparatus which is adapted to control a power supply to an electrical load and which protects the connected electrical load efficiently.

SUMMARY OF THE INVENTION

The invention provides a load control apparatus for controlling a power supply to an electrical load connected to an output terminal of the load control apparatus, the load control apparatus comprising:
  an overcurrent protection circuit having at least one input terminal adapted to receive a supply voltage from a power supply network and having a power switch through which the connected electrical load receives an electrical load current and having a current rise speed sensor component connected in series with the power switch and adapted to generate directly a voltage drop corresponding to the current rise speed of the electrical load current flowing from the input terminal of the load control apparatus via the current rise speed sensor component and the power switch to the output terminal and having a driver circuit, which comprises a low voltage side and a high voltage side, wherein the low voltage side of the driver circuit is connected to a control unit and the high voltage side of the driver circuit is connected to the power switch, wherein the driver circuit is adapted to detect an occurring overcurrent depending on the voltage drop generated by the current rise speed sensor component and/or depending on a non-linear voltage drop along the power switch applied to a drive input at the high voltage side of the driver circuit, wherein the driver circuit is adapted to switch off said power switch if a configurable threshold voltage is exceeded within a predefined switch-off,
  said load control apparatus further comprising
  a power supply control circuit having a voltage sensor component adapted to measure at the input terminal the supply voltage notified by the voltage sensor component to the control unit of the load control apparatus to provide a supply voltage profile stored in a data memory of the load control unit, wherein the control unit is adapted to control an electrical power supplied to the connected electrical load depending on the supply voltage profile and depending on a load current profile stored in the data memory of the control unit.

The switch-off period can be adjustable in a range between 2 microseconds and 1 millisecond.

In a possible embodiment the voltage drop generated by the sensor component and the voltage drop along the power switch are added and supplied as a sum voltage to the drive input of the diver circuit.

In a possible embodiment the predefined switch off period is less than 1 millisecond. The switch-off period can in a possible embodiment be less than 5 microseconds.

The connected load can comprise different load types including a resistive load, a capacitive load and/or an inductive load.

In a possible embodiment of the load control apparatus according to the first aspect of the present invention, the load control apparatus further comprises an overload protection circuit having a sensor component adapted to measure continuously the load current flowing to the output terminal notified to the control unit of the load control apparatus adapted to determine an overload state and/or type of the electrical load on the basis of the measured load current profile.

In a further possible embodiment of the load control apparatus according to the first aspect of the present invention, a control unit is adapted to control the driver circuit to switch-off the power switch if an overload state of the electrical load is determined by the control unit.

In a still further possible embodiment of the load control apparatus according to the first aspect of the present invention, the control unit is adapted to control the electrical power supplied to the electrical load depending on an operation mode of the electrical load on the basis of the load current profile measured by the sensor component of the overload protection circuit and on the basis of a supply voltage profile measured by the sensor component of the power supply control circuit at the input terminal of the load control apparatus.

In a still further possible embodiment of the load control apparatus according to the first aspect of the present invention, the sensor component of the overcurrent protection circuit comprises a coil which is adapted to generate an induction voltage drop depending on the current rise speed of the load current flowing through the sensor component of the overcurrent protection circuit.

In a still further possible embodiment of the load control apparatus according to the first aspect of the present invention, the sensor component of the overload protection circuit comprises a Hall sensor, a GMR sensor, a shunt resistor a transformer adapted to measure continuously the load current flowing through the output terminal of the load control apparatus to provide the load current profile.

In a further possible embodiment of the load control apparatus according to the first aspect of the present invention, the power supply control circuit has at least one sensor component formed by a voltage divider adapted to supply a fraction of the supply voltage at the input terminal and/or at the output terminal to the control unit of the load control apparatus to provide a supply voltage profile.

In a further possible embodiment of the load control apparatus according to the first aspect of the present invention, the sensor component of the overload protection circuit and the sensor component of the power supply control circuit are connected to associated analog-to-digital converters adapted to convert the measured analog load current profile and the measured supply voltage profile into corresponding measurement values stored in a data memory of the control unit as load current profile data and supply voltage profile data.

In a further possible embodiment of the load control apparatus according to the first aspect of the present invention, a processor or FPGA of the control unit is adapted to calculate a power factor on the basis of the load current profile data and the supply voltage profile data stored in the data memory of the control unit.

In a further possible embodiment of the load control apparatus according to the first aspect of the present invention, the electrical load is an electrical motor comprising as operation modes an idle operation mode wherein the electrical motor is switched off and the rotation speed of the electrical motor is zero, a start operation mode wherein the electrical motor is started and the rotation speed of the electrical motor is increased, a steady-state operation mode wherein the rotation speed of the electrical motor is maintained constant, and a stop operation mode wherein the electrical motor is stopped and the rotation speed of the electrical motor is decreased.

In a further possible embodiment of the load control apparatus according to the first aspect of the present invention, the driver circuit is adapted to switch off the power switch automatically, if an applied sum voltage comprising the voltage drop generated by the sensor component plus the voltage drop along the power switch exceeds a configurable threshold voltage within the switch-off period to protect the load control apparatus itself and the electrical load against overload and/or against overcurrent.

In a further possible embodiment of the load control apparatus according to the first aspect of the present invention, a processor of the control unit is adapted to determine an operation mode and/or a specific operation state of the connected electrical load by processing the load current profile data and/or the supply voltage profile data stored in the data memory of the control unit.

In a further possible embodiment of the load control apparatus according to the first aspect of the present invention, the control unit is adapted to control the driver circuit of the load control apparatus on reception of a control command such that the power switch is switched either on or off according to the received control command.

In a further possible embodiment of the load control apparatus according to the first aspect of the present invention, the control unit of the load control apparatus is adapted to receive the control command from a user interface of the load control apparatus, from a computer connected to said load control apparatus or from a stored program control of an automation system.

In a further possible embodiment of the load control apparatus according to the first aspect of the present invention, the power switch of the load control apparatus comprises an IGBT or a power MOSFET, in particular a SiC MOSFET, a GaN MOSFET or a ScAlN MOSFET.

In a further possible embodiment of the load control apparatus according to the first aspect of the present invention, the control unit of the load control apparatus is adapted to derive based on at least one operation parameter of the connected electrical load and the stored profile data a temperature profile of components of the electrical load and/or of components of the load control apparatus and to control the driver circuit to switch off the power switch if a deviation from a predetermined temperature range is detected.

In a still further possible embodiment of the load control apparatus according to the first aspect of the present invention, the power switch is switched on after a configurable wait period and/or after successful clearance of a switch-off cause and/or if other predetermined switch-on conditions are fulfilled.

In a still further possible embodiment of the load control apparatus according to the first aspect of the present invention, the electrical load comprises a multiphase motor which receives via the load control apparatus several electric current phases as operation load currents.

In a still further possible embodiment of the load control apparatus according to the first aspect of the present invention, the load control apparatus comprises for each electrical current phase an associated overcurrent protection circuit, a power supply control circuit and an overload protection circuit.

In a further possible embodiment of the load control apparatus according to the first aspect of the present invention, for each electrical current phase or for each DC current direction a first power switch is provided for a positive current half-wave of an AC current or for a positive DC current and wherein a second power switch is provided for a negative current half-wave of an AC current or for a negative DC current.

In a further possible embodiment of the load control apparatus according to the first aspect of the present invention, the power switches are connected via half-bridge or full-bridge rectifier circuits with associated driver circuits of the control apparatus.

In a further possible embodiment of the load control apparatus according to the first aspect of the present invention, the load control apparatus comprises a user interface adapted to signal an operation state of the load control apparatus and/or an operation state of the connected electrical load.

In a further possible embodiment of the load control apparatus according to the first aspect of the present invention, the driver circuit comprises a low voltage side connected to the control unit and a high voltage side connected to the power switch, wherein the low voltage side and the high voltage side of the driver circuit are galvanically separated from each other.

In a further possible embodiment of the load control apparatus according to the first aspect of the present invention, the control unit is adapted to perform a phase angle control and/or to apply a predefined switching pattern to the power switch depending on the calculated power factor and the operation mode of the electrical load.

In a further possible embodiment of the load control apparatus according to the first aspect of the present invention, the processor or FPGA of the control unit has access to at least one load operation characteristic of the electrical load indicating for operation parameters at least one admissible operation zone, at least one critical operation zone and/or at least one inadmissible operation zone.

The processor or FPGA of the control unit can also have access to at least one operation characteristic of a component of the load control apparatus itself indicating for operation parameters of the respective component at least one admissible operation zone, at least one critical operation zone and/or at least one inadmissible operation zone.

In a further possible embodiment of the load control apparatus according to the first aspect of the present invention, the processor of the control unit is adapted to evaluate the load current profile data and/or the supply voltage profile data stored in the data memory of the control unit with respect to the load operation characteristics of the electrical load and/or of the internal component to determine whether operation parameter combinations of different operation parameters are in a critical or inadmissible operation zone of the load operation characteristic and/or of a component operation characteristics.

In a further possible embodiment of the load control apparatus according to the first aspect of the present invention, the control unit outputs a warning signal via an output interface of the load control apparatus if an operation parameter combination of the operation parameters is determined to be in a critical operation zone of a load operation characteristic of the electrical load and/or the operation characteristic of the component of the load control apparatus. This component may comprise e.g., the power switch of the load control apparatus.

In a further possible embodiment of the load control apparatus according to the first aspect of the present invention, the control unit of the load control apparatus generates automatically a switch-off control signal applied to the power switch to switch off the load current if an operation parameter combination of operation parameters is determined to be in an inadmissible operation zone of a load operation characteristic of the electrical load and/or the operation characteristic of the monitored integrated component of the load control apparatus.

In a further possible embodiment of the load control apparatus according to the first aspect of the present invention, different load operation characteristics and/or component operation characteristics for different operation parameter combinations are stored in a memory of the control unit.

In a further possible embodiment of the load control apparatus according to the first aspect of the present invention, the control unit of the load control apparatus is adapted to determine whether the received supply voltages at different input terminals provided for different phases indicate a symmetrical power supply of the load control apparatus by the power supply network connected to the input terminals of the load control apparatus and/or a symmetrical power supply of the connected load by the load control apparatus on the basis of the supply voltage profile data stored in the data memory of the control unit.

A symmetrical power supply of the connected load by the load control apparatus can be monitored by the control unit.

In a further possible embodiment of the load control apparatus according to the first aspect of the present invention, the control unit is adapted to switch off automatically the power switches if an unsymmetrical power supply of the load control apparatus by the power supply network or an unsymmetrical power supply of the connected load by the load control apparatus is recognized by the control unit.

The invention provides according to the second aspect an automation system comprising a load control apparatus according to the first aspect of the present invention and an electrical load connected to the output terminals of said load control apparatus.

BRIEF DESCRIPTION OF FIGURES

In the following, possible embodiments of the different aspects of the present invention are described in detail with respect to the enclosed figures.

FIGS. 2A, 2B, 2C show a block diagram of a possible exemplary embodiments of a load control apparatus according to the first aspect of the present invention;

DETAILED DESCRIPTION OF EMBODIMENTS

Figure 1:
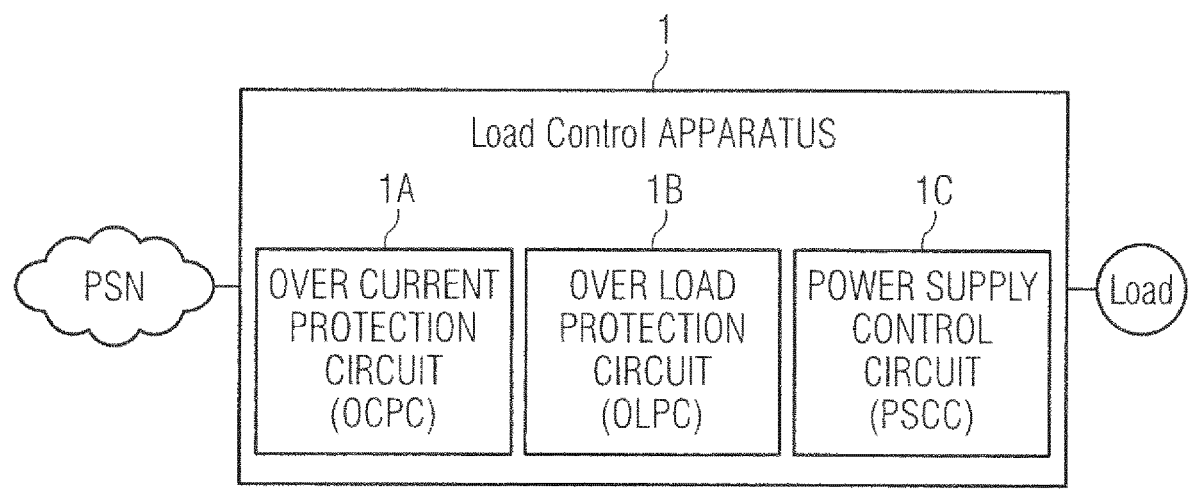
FIG. 1 shows a block diagram of a possible exemplary embodiment of a load control apparatus according to the first aspect of the present invention.

As can be seen from the block diagram of FIG. 1, a load control apparatus 1 according to the first aspect of the present invention can comprise several main circuits including an overcurrent protection circuit 1A, an overload protection circuit 1B and a power supply control circuit 1C. The load control apparatus 1 can be provided between a power supply network PSN and an electrical load as illustrated in FIG. 1. The electrical load is connected to an output terminal 3 of the load control apparatus 1. In a possible embodiment, the load control apparatus 1 comprises an overcurrent protection circuit 1A and a power supply control circuit 1C. In a still further possible embodiment, the load control apparatus 1 comprises an overcurrent protection circuit 1A, an overload protection circuit 1B and a power supply control circuit 1C as shown in FIG. 1 and FIGS. 2A, 2B, 2C. The load can comprise an inductive load such as a motor, a capacitive load or a resistive load or a combination between them.

In general, an electrical load is an electrical component or portion of a circuit that consumes electric power. An electrical load consumes electrical energy in the form of the received electrical currents which can transform this electrical energy into other forms like heat, light, work, etc. Inductive loads also called lagging loads are AC loads that are predominantly inductive in nature so that the alternating current lags behind the alternating voltage when electrical current flows into the load. In contrast, a capacitive load is a load that has a capacitive, i.e., negative, reactance at the frequency of operation. A capacitive load causes the electrical current wave to lead the voltage wave. Thus, the power factor of a capacitive load is leading. A resistive load is a type of load that draws current in the same proportion of the applied voltage. A resistive load is typically used to convert electrical current into other form of energy such as heat. The voltage wave and the current phase are of the same phase as of a resistive load.

Figure 2A:
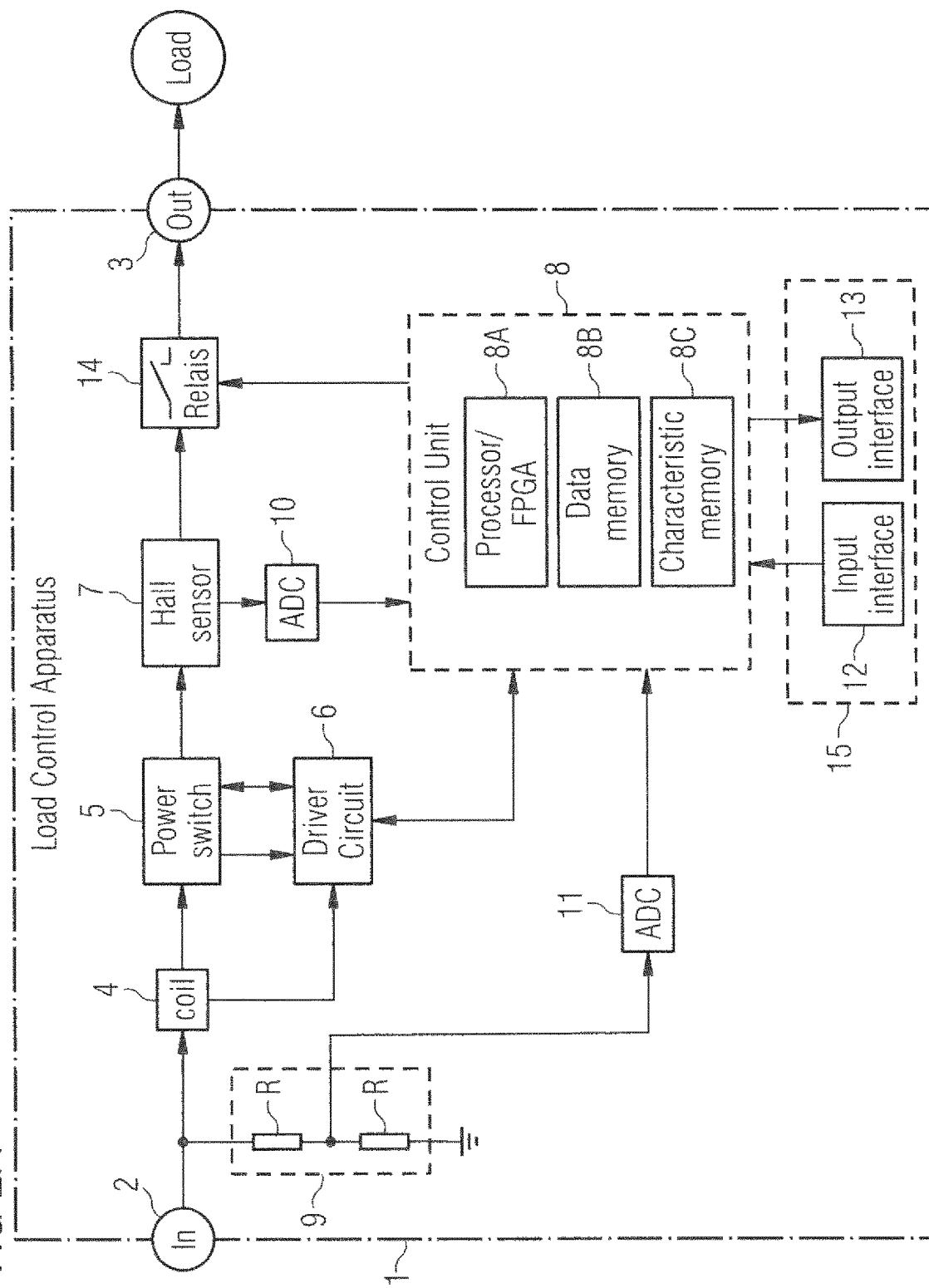
Figure 2C:
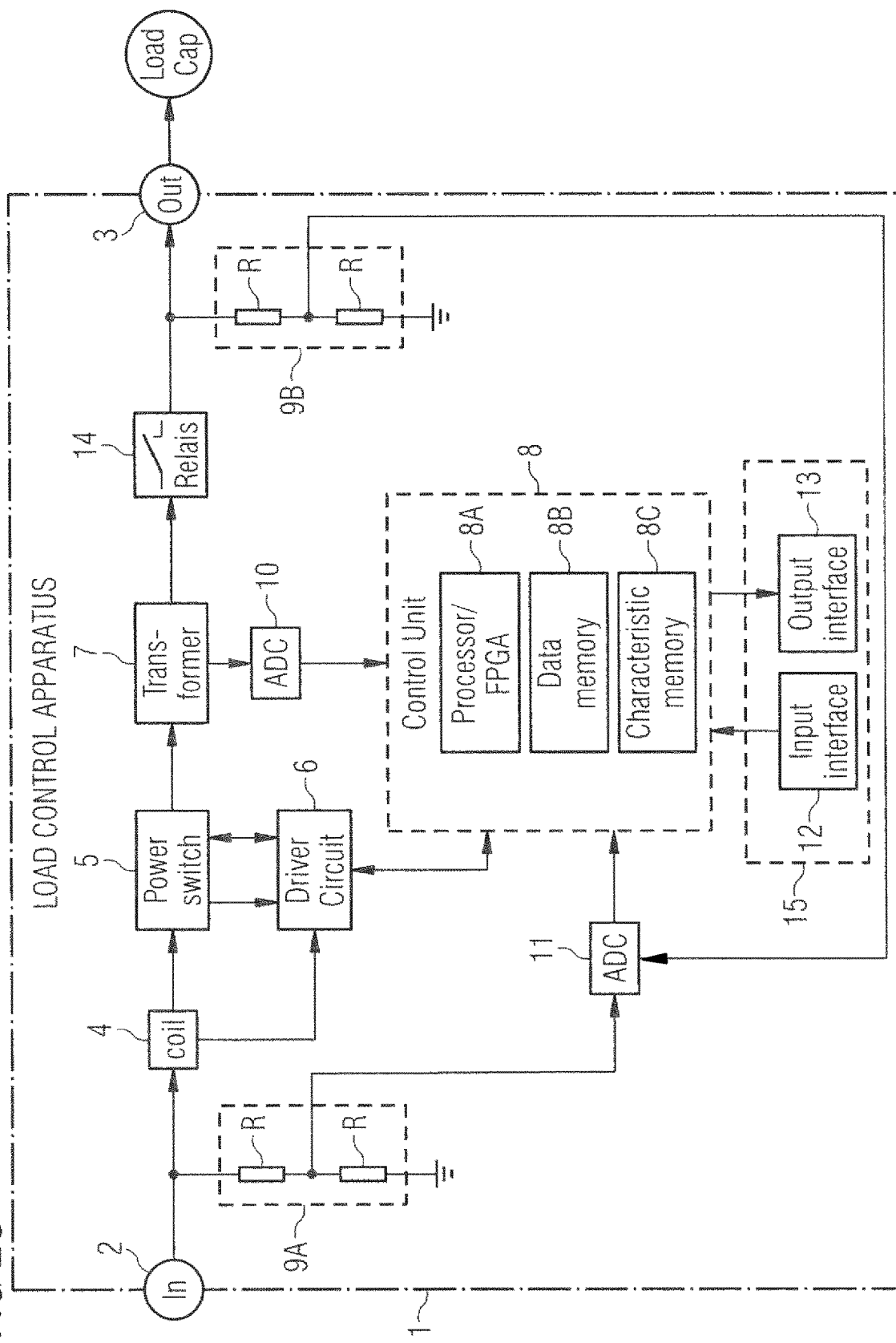

FIGS. 2A, 2B, 2C show possible embodiments of a load control apparatus 1 including an overcurrent protection circuit 1A, an overload protection circuit 1B and a power supply control circuit 1C. The overcurrent protection circuit 1A has an input terminal 2 to receive electrical power from the power supply network PSN shown in FIG. 1. The load control apparatus 1 further comprises an output terminal 3 used to connect an electrical load to the load control apparatus 1. As can be seen in FIG. 2A, a sensor component 4 formed by a coil is connected in series with a power switch 5. The sensor component 4 is adapted to generate directly a voltage drop $\Delta U_4$ corresponding to a current rise speed of the electrical load current $I_L$ flowing from the input terminal 2 of the load control apparatus 1 via the sensor component 4 and the power switch 5 to the output terminal 3 of the load control apparatus 1. The overcurrent protection circuit (OCPC) 1A includes the power switch 5 through which the electrical load receives the electrical load current $I_L$ and the sensor component 4 connected in series with the power switch 5. In a possible embodiment, the sensor component 4 of the overcurrent protection circuit 1A comprises a coil which is adapted to generate an induction voltage drop $\Delta U_4$ depending on the current rise speed of the load current $I_L$ flowing through the sensor component 4 of the overcurrent protection circuit 1A. The overcurrent protection circuit 1A further comprises a driver circuit 6 as shown in the block diagrams of FIGS. 2A, 2B, 2C. The driver circuit 6 is adapted to detect an occurring overcurrent depending on the voltage drop $\Delta U_4$ generated by the sensor component 4 and a voltage drop $\Delta U_5$ along the power switch 5. The voltage drop $\Delta U_4$ generated by the sensor component 4 and the voltage drop $\Delta U_5$ along the power switch 5 is applied to the driver circuit 6 as a sum voltage $U_\Sigma = \Delta U_4 + \Delta U_5$. The hardwired driver circuit 6 is adapted to switch off the power switch 5 upon detection of an overcurrent with a switch-off period of less than one millisecond. The switch-off period can be adjustable in a possible embodiment in a range between two microseconds and one millisecond. The non-linear voltage drop $\Delta U_5$ on the power switch 5 is used as a value representative of the momentary current in the sum voltage $U_\Sigma$.

The protected switch-off is responsive to a combination of both of the value of the current and to the value of the rate of change of the current.

The load control apparatus 1 according to the present invention further comprises in the illustrated embodiment of FIGS. 1, 2 a power supply control circuit (PSCC) 1C. The power supply control circuit 1C comprises at least one sensor component 9 adapted to measure at the input terminal 2 of the load control apparatus 1 a supply voltage $U_{in}$ notified to a control unit 8 of the load control apparatus 1. The control unit 8 is adapted to control the electrical power supplied to the electrical load depending on a type and/or an operation mode of the electrical load. The type of the electrical load can comprise a resistive, inductive or capacitive load type. In the illustrated embodiment of FIGS. 2A, 2B, the power supply control circuit 1C has a sensor component 9 formed by a voltage divider adapted to supply a fraction of the supply voltage U at the input terminal 2 of the load control apparatus 1 to the control unit 8 of the load control apparatus 1 to provide a supply voltage profile over time. A further sensor component 9 can also be provided at an output terminal 3 to measure the output voltage as shown in FIG. 2C. This is necessary for a capacitive load. In this case the capacitive load is only switched on if the voltage measured by the first voltage divider 9A at the input terminal 2 corresponds to the voltage measured by the second voltage divider 9B at the output terminal 3.

Further in the embodiment of FIGS. 1, 2A, 2B, 2C, the load control apparatus 1 also comprises an overload protection circuit (OLPC) 1B having a sensor component 7 adapted to measure continuously the load current $I_L$ flowing to the output terminal 3. The measured load current $I_L$ is notified by the sensor component 7 to the control unit 8 of the load control apparatus 1 which is adapted to determine an overload state of the electrical load on the basis of the measured load current profile. The sensor component 7 can also provide measurements to the driver circuit 6 for fault detection. The control unit 8 of the load control apparatus 1 is further adapted to control the driver circuit 6 to switch off the power switch 5 automatically if an overload state of the electrical load has been determined by the control unit 8. As can be seen in FIGS. 2A, 2B, 2C, the sensor component 7 of the overload protection circuit 1B and the sensor component 9 of the power supply control circuit 1C are both connected to associated analog-to-digital converters 10, 11. The analog-to-digital converters 10, 11 are adapted to convert the measured analog load current profile received from the sensor component 7 and the measured supply voltage profile measured by the sensor component 9 into corresponding measurement values (samples). The sampling rate can e.g., be 4 kHz. The resolution may comprise at least 12 bits. The measurement values provided by the analog-to-digital converters 10, 11 are stored as data samples in a data memory of the control unit 8 as load current profile data and as supply voltage profile data. In the illustrated embodiments of FIG. 2A to 2B, the control unit 8 comprises a processor or FPGA 8A and a data memory 8B to store on the fly during operation load current profile data and supply voltage profile data. The control unit 8 can further comprise a memory 8C to store different load operation characteristics, i.e., operation characteristics for different operation parameters and/or for different types of loads, i.e., for resistive, capacitive or inductive loads. The ADCs 10, 11 can also be integrated in a processor of the control unit 8.

In a possible embodiment, the overload protection circuit 1B can also include an electromechanical relay 14 connected in series with the power switch 5 and controlled by the control unit 8. As soon as an overload state is recognized by the control unit 8, it can either command the driver circuit 6 to open the power switch 5 and/or control the relay 14 to open and interrupt the current flow.

The control unit 8 having a processor or FPGA 8A is adapted to control the electrical power supply to the electrical load connected to the output terminal 3 of the load control apparatus 1 depending on a type and/or operation mode of the electrical load and on the basis of the load current profile measured by the sensor component 7 of the overload protection circuit 1B and on the basis of the supply voltage profile measured by the at least one sensor component 9 of the power supply control circuit 1C at the input terminal 2 of the load control apparatus 1. In a possible embodiment, the sensor component 7 of the overload protection circuit 1B comprises a Hall sensor adapted to measure continuously the load current $I_L$ flowing to the output terminal 3 of the load control apparatus 1 to provide the load current profile. The sensor component 7 can also comprise a GMR sensor (as shown in FIG. 2B) or a transformer. A type of the connected load can be selected in a possible embodiment by an operator by means of the user interface 15. This user interface can be connected by means of a data interface integrated in the housing of the apparatus 1 or be integrated itself in the housing of apparatus 1.

In a possible embodiment, the processor or FPGA 8A of the control unit 8 is adapted to calculate a power factor cos φ on the basis of the load current profile data and the supply voltage profile data stored in the data memory 8B of the control unit 8. The profile data can be stored for a predetermined moving time window in the data memory 8B. The firmware of the processor 8A can be programmable for different use cases. For instance, the overload protection provided by the overload protection circuit 1B can be programmed. In contrast the overcurrent protection provided by the overcurrent protection circuit 1A is hardwired and very fast since it does not involve the processor of the control unit 8.

Figure 3:
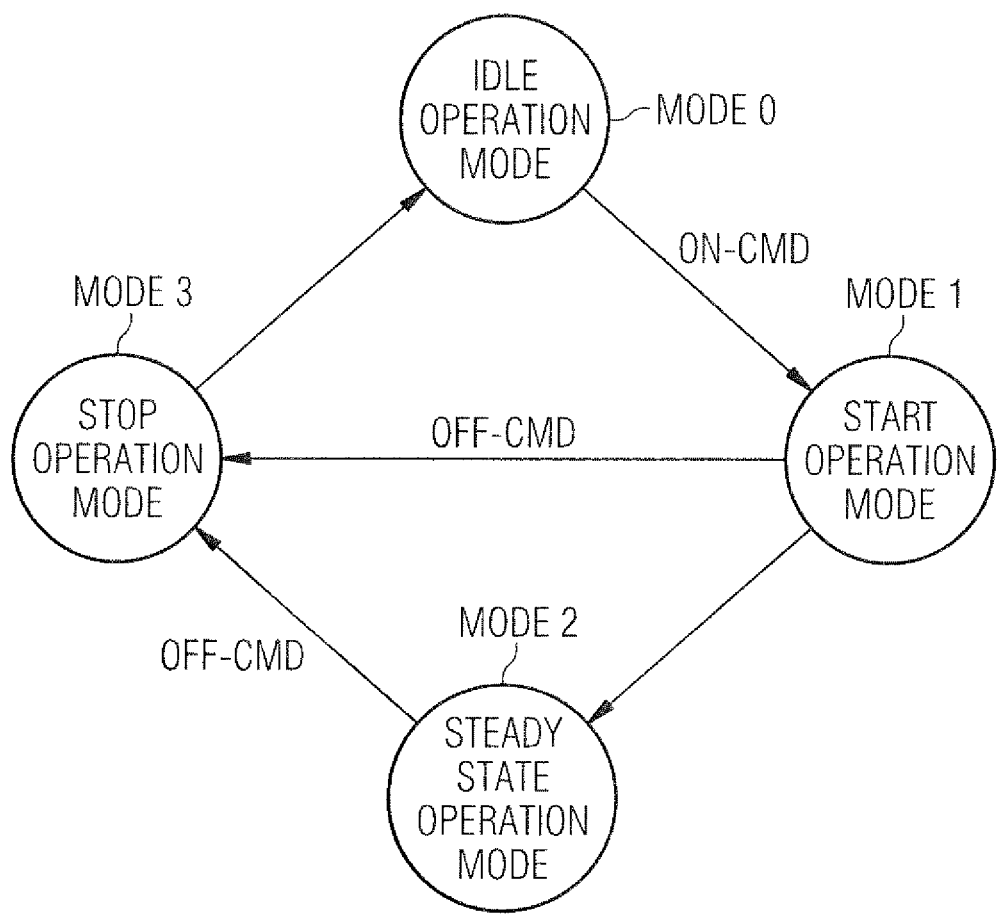
FIG. 3 shows a state diagram to illustrate a possible exemplary implementation of a load control apparatus according to the first aspect of the present invention.

The electrical load connected to the output terminal 3 can comprise different operation modes. For instance, an electrical motor M as an inductive load can comprise different operation modes. FIG. 3 shows a state diagram to illustrate different possible operation modes of an electrical motor connected as a load to the output terminal 3 of the load control apparatus 1. In the illustrated example, the connected electrical motor M comprises an idle operation mode, a start operation mode, a steady-state operation mode and a stop operation mode. In the idle operation mode, the electrical motor M is switched off and the rotation speed of the electrical motor M is zero. In response to an on-command, a transition is performed from the idle operation mode into the start operation mode. In the start operation mode, the electrical motor M is started and the rotation speed of the electrical motor M is increased. In the steady-state operation mode of the motor M, the rotation speed of the electrical motor M is maintained constant. Further, in a stop operation mode, the electrical motor M is stopped and the rotation speed of the electrical motor M is decreased. In response to an off-command, either in the start operation mode or in the steady-state operation mode, the control unit 8 transits into a stop operation mode until the rotation speed of the electrical motor M becomes zero.

The processor or FPGA 8A of the control unit 8 is adapted to determine the operation mode and/or a specific operation state of the connected electrical load such as a motor M by processing the load current profile data and/or the supply voltage profile data available in the data memory 8B of the control unit 8.

As also illustrated in the state diagram of FIG. 3, the control unit 8 is adapted to control the driver circuit 6 of the load control apparatus 1 on reception of a control command CMD such that the power switch 5 is switched either on or off according to the received control command CMD. In a possible embodiment, the control unit 8 of the load control apparatus 1 is adapted to receive the control command CMD from a user interface of the load control apparatus 1. In the illustrated exemplary embodiment of FIG. 2, the load control apparatus 1 comprises an input interface 12 and an output interface 13. In an alternative embodiment, the control unit 8 of the load control apparatus 1 can also receive a control command from a computer connected to the load control apparatus 1 or from a stored program control of an automation system.

In a possible embodiment, the control unit 8 of the load control apparatus 1 is adapted to derive based on at least one operation parameter of the connected electrical load and the profile data stored in the data memory 8B an associated temperature profile of components of the electrical load and/or of components of the load control apparatus 1 itself and is further adapted to control the driver circuit 6 to switch off the power switch 5 if a deviation from a predetermined temperature range has been detected. The power switch 5 of the load control apparatus 1 can in a possible embodiment also be switched on after a configurable wait period and/or after successful clearance of a switch-off cause and/or if other predetermined switch-on conditions are fulfilled. The power switch 5 can comprise different kinds of solid-state devices including an IGBT or a power MOSFET. The power MOSFET can comprise a SiC MOSFET, a GaN MOSFET or a ScAlN MOSFET. The connected electrical load as shown in FIG. 2 can comprise in a possible embodiment a multiphase motor M which receives via the load control apparatus 1 several electrical current phases L as operation load currents $I_L$. In a possible implementation, the load control apparatus 1 comprises for each electrical current phase L an overcurrent protection circuit 1A, a power supply control circuit 1C and an overload protection circuit 1B. In a possible embodiment, the electrical load is an electrical motor M, in particular a three-phase electrical motor M. The three-phase electrical motor M can comprise a three-phase induction motor, i.e., an asynchronous motor. The induction motor uses electrical current delivered in three phases L in a sequence into the coils of a stator to create a rotating magnetic field. This magnetic field induces an electrical field in a coil or squirrel cage to drive a rotor of the induction motor M. The difference in speed between the rotor, i.e., the synchronous speed, and the rotating magnetic field is also called the slip. A symmetrical three-phase winding system of the stator of the induction motor M is connected to a three-phase power supply network PSN with the appropriate voltage and frequency. Sinusoidal currents of the same amplitude can flow in each of the three winding phases L. Each of the electrical currents are temporarily offset from each other by 120°. Since the phases L are also spatially offset by 120°, the stator of the electrical motor M builds up a magnetic field that rotates with the frequency of the applied voltage. The rotating magnetic field induces an electrical voltage in the rotor winding or rotor bars. Short circuit currents can flow because the winding is short-circuited by a ring. Together with the rotating magnetic field, these electrical currents build mechanical forces and produce a torque over the radius of the rotor that can accelerate the rotor speed in the direction of the rotating field. In the induction motor, the frequency of the voltage generated in the rotor of the electrical motor M drops as the speed of the rotor increases. This is because the difference between the rotating field speed and the rotor speed becomes smaller. If the rotor of the electrical motor M were to turn at the same speed as the rotating magnetic field, it would rotate synchronously and no voltage would be induced and the electrical motor M would not be able to develop any torque as a result. However, the load torque and friction torque in the bearings lead to a difference between the rotor speed and the rotating magnetic field speed and this results in an equilibrium between the acceleration torque and the load torque. As a consequence, the electrical induction motor runs asynchronously and is also called an asynchronous motor. In a possible embodiment, the load control apparatus 1 is provided for an asynchronous induction motor M connected to the output terminal 3 of the load control apparatus 1.

The load control apparatus 1 according to the present invention as illustrated in FIGS. 1, 2 can also be provided for other kinds of electrical loads, in particular also for a synchronous motor. In a synchronous motor the rotating magnetic field of the stator is synchronous to the magnetic field of the rotor. The load control apparatus 1 according to the present invention can also be used for DC driven motors.

Figure 9:
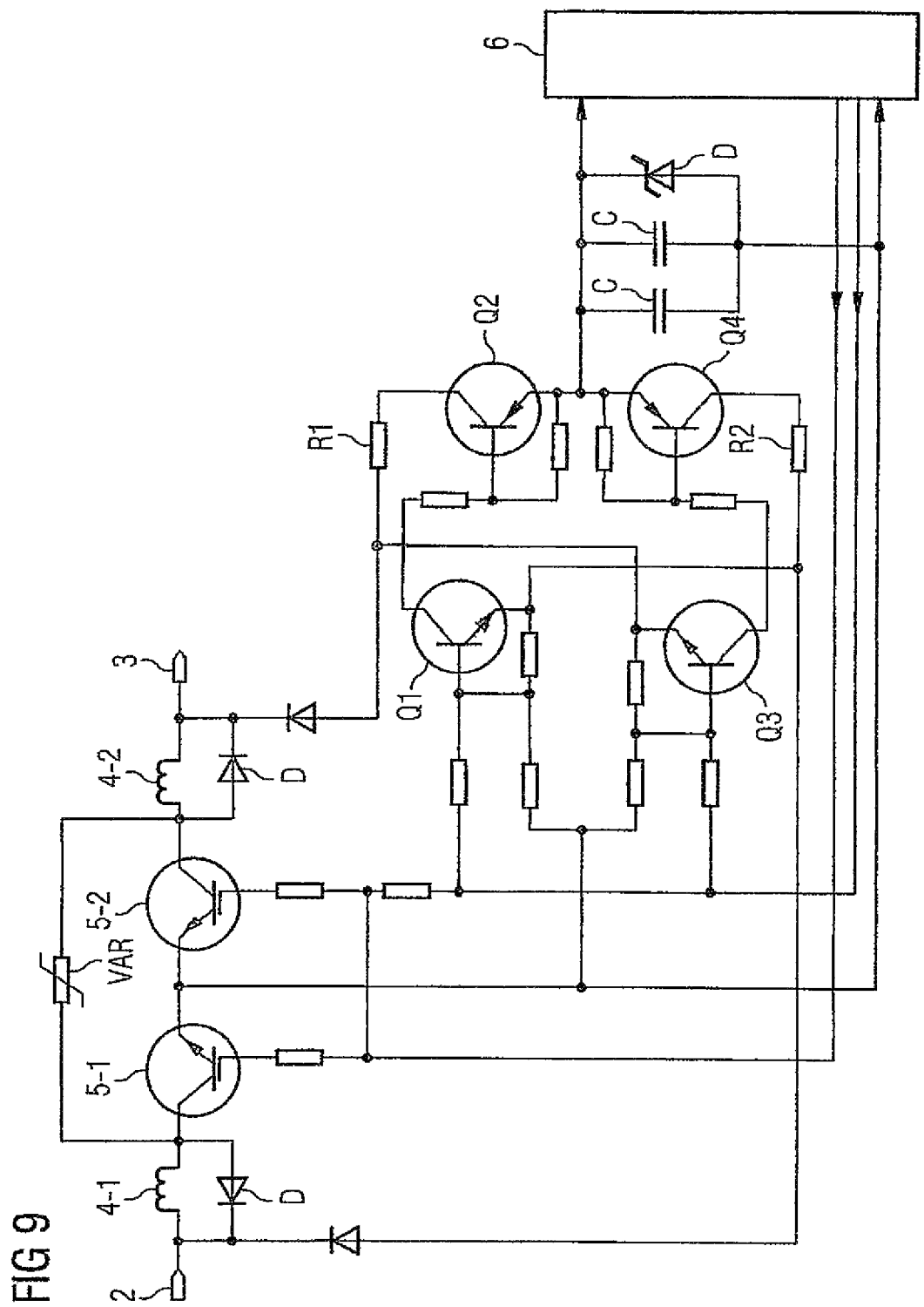
FIG. 9 shows a circuit diagram of a possible exemplary embodiment of an overcurrent protection circuit which can be used in a load control apparatus according to the present invention.
Figure 10:
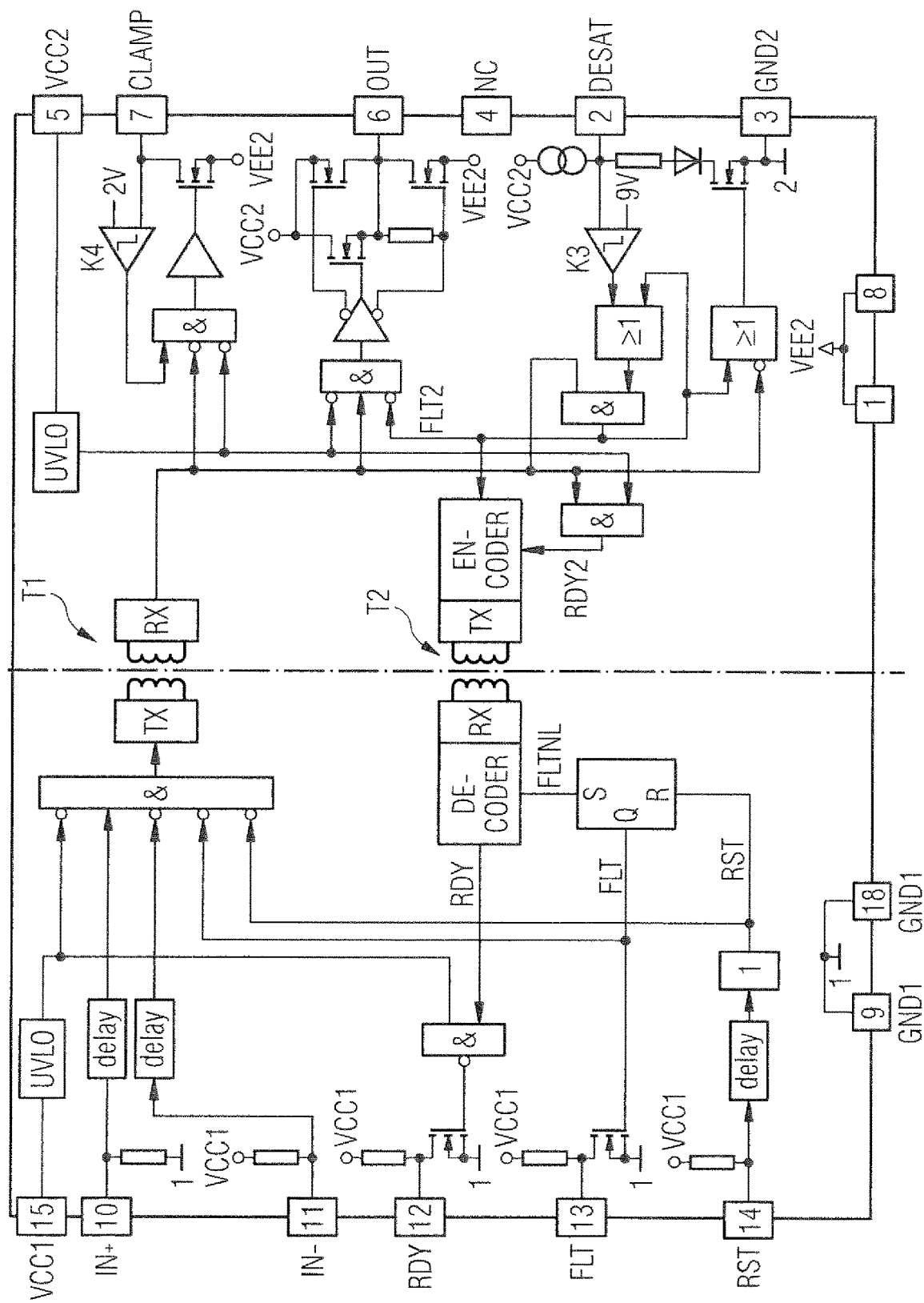
FIG. 10 shows a circuit diagram for illustrating an exemplary implementation of a driver circuit used in a load control apparatus according to the present invention.

As also illustrated in the embodiment shown in FIG. 9, for each electrical current phase L or for each DC current direction, a first power switch 5-1 is provided for a positive current half-wave of an AC current or for a positive DC current. Further, a second power switch 5-2 can be provided for a negative current half-wave of an AC current or for a negative DC current. The power switches 5 can be connected via half-bridge or full-bridge rectifier circuits with associated driver circuits 6 of the load control apparatus 1. As illustrated in FIG. 10, the driver circuit 6 can comprise a low voltage side connected to the control unit 8 and a high voltage side connected to the power switch 5. In a preferred embodiment, the low voltage side and the high voltage side of the driver circuit 6 are galvanically separated from each other.

In a possible embodiment of the load control apparatus 1 according to the present invention, the processor or FPGA 8A of the control unit 8 is adapted to perform a phase angle control and/or to apply a predefined switch pattern to the power switch 5 via the driver circuit 6 depending on the calculated power factor cos φ and a current operation mode of the electrical load connected to the load control apparatus 1. To this end, the processor or FPGA 8A of the control unit 8 has access to at least one load operation characteristic of the electrical load indicating for operation parameters at least one admissible operation zone, at least one critical operation zone and/or at least one inadmissible operation zone.

Figure 5:
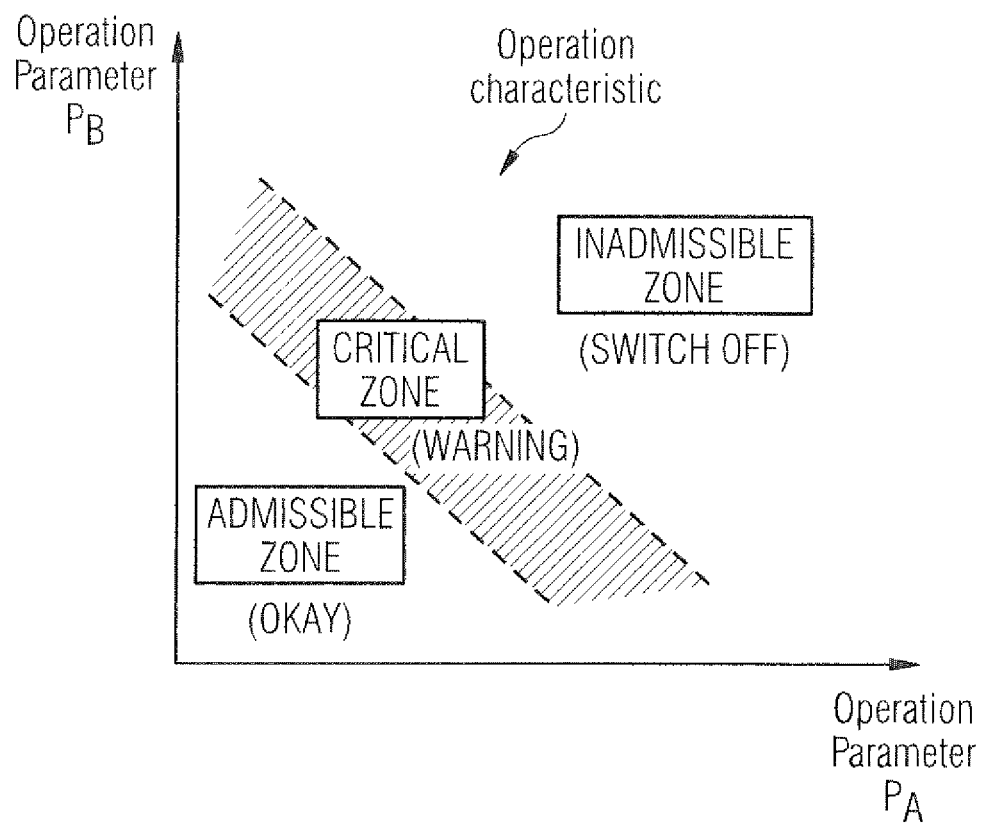
FIG. 5 illustrates schematically possible load operation characteristics of an electrical load connected to a load control apparatus according to the present invention.

FIG. 5 shows schematically a load operation characteristic for an electrical load to provide protection. The different zones of the load operation characteristic can be defined by at least two operation parameters $P_A$, $P_B$ as shown in FIG. 5.

Figure 6:
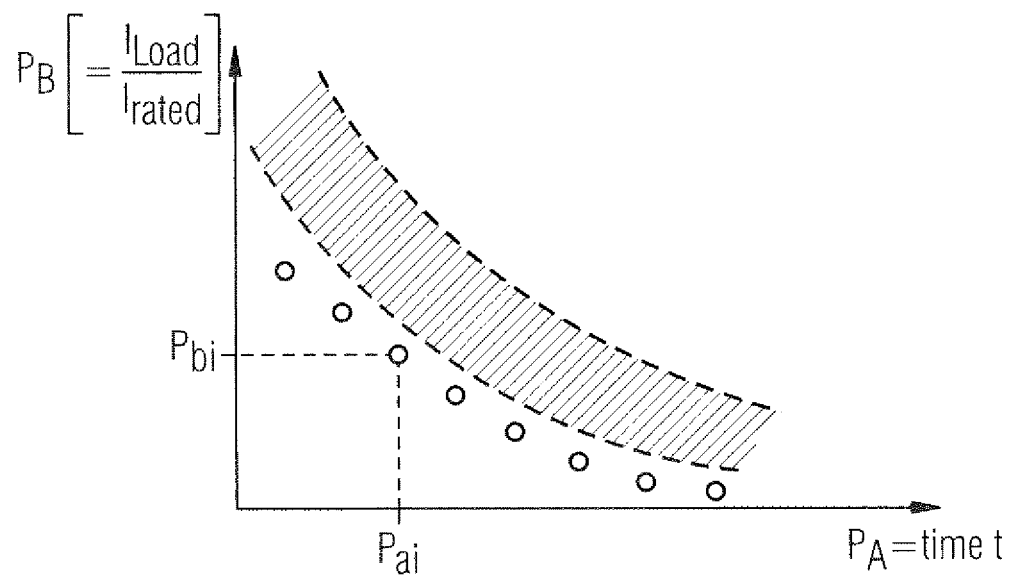
FIGS. 6, 7 show further exemplary load operation characteristics to illustrate the operation of a load control apparatus according to the present invention.
Figure 7:
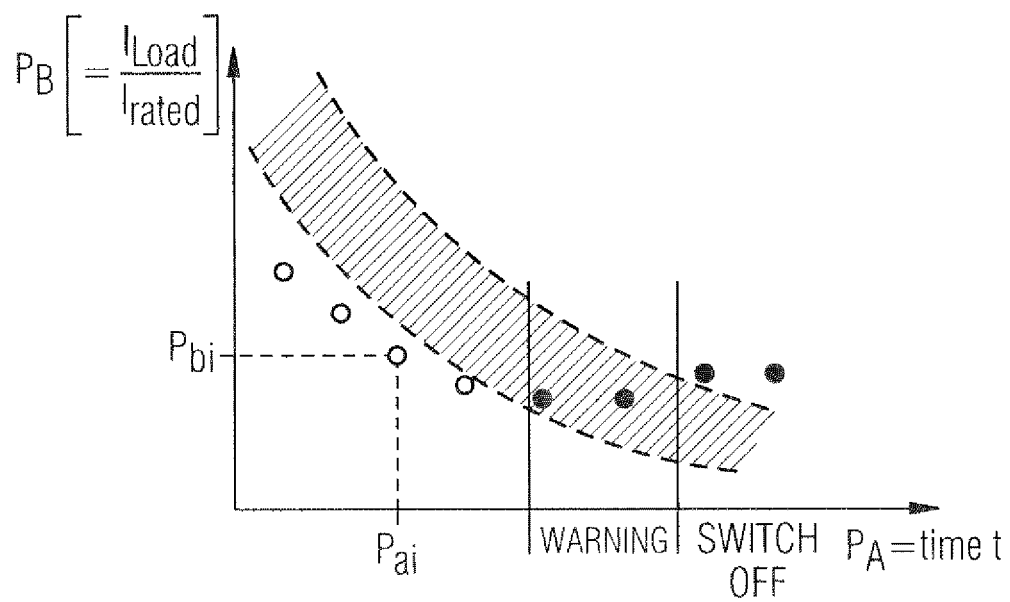

FIGS. 6, 7 show examples of a load operation characteristic which can be stored in a memory 8C of the control unit 8 and used by the processor or FPGA 8A to provide protection of a load, in particular overload protection. As can be seen in FIGS. 6, 7, the processor or FPGA 8A of the control unit 8 is adapted to evaluate load current profile data and/or supply voltage profile data stored in the data memory 8B of the control unit 8 with respect to the load operation characteristics of the electrical load stored in the load characteristic memory 8C to determine whether operation parameter combinations of different operation parameters P are in a critical or inadmissible operation zone of the respective load operation characteristic. In the example shown in FIGS. 6, 7, a parameter $P_B$ given by the ratio between the load current and the rated current of a motor as a load is illustrated over time t to show two different scenarios. In the scenario illustrated in FIG. 6, the calculated ratio between the sampled load current and the predefined rated current provides values which are all in the admissible zone of the load operation characteristic. In contrast, in the scenario shown in FIG. 7, the ratio values (first parameter $P_B$) are initially in the admissible zone and then move in time (second parameter) into the critical zone and finally into an inadmissible zone as shown in FIG. 7. When the parameter $P_B$ reaches the critical zone the control unit 8 can trigger a warning signal. As soon as the operation parameter $P_B$ reaches the inadmissible zone, the processor or FPGA 8A of the control unit 8 can trigger a switch-off operation mode where the power switch 5 is switched off by the driver circuit 6 in response to a control command received from the control unit 8. Alternatively, the control unit 8 may control another switch connected in series to the power switch 5 to switch off the load in case that an inadmissible operation zone is reached. In a possible embodiment, the control unit 8 can output a warning signal via an output interface 13 of the load control apparatus 1 as shown in FIG. 2 if an operation parameter combination of the operation parameters is determined to be in a critical operation zone of a load operation characteristic of the respective electrical load.

Further, the control unit 8 can generate automatically a switch-off control signal applied to the power switch 5 or to another switch (e.g., relay 14) to switch off the load current $I_L$ if an operation parameter combination of operation parameters is determined to be in an inadmissible operation zone of a load operation characteristic of the respective electrical load. In a possible embodiment, different load operation characteristics for different operation parameter combinations can be stored in the memory 8C of the control unit 8.

In a possible embodiment, the control unit 8 of the load control apparatus 1 is adapted to determine whether the received supply voltages at different input terminals 2 provided for different phases L indicate a symmetrical power supply by the power supply network PSN connected to the input terminal 2 of the load control apparatus 1 on the basis of the supply voltage profile data stored in the data memory 8B of the control unit 8. The control unit 8 is adapted to switch off automatically the power switches 5 at the different phases if an unsymmetrical power supply of the power supply network PSN is recognized by the control unit 8.

Figure 4:
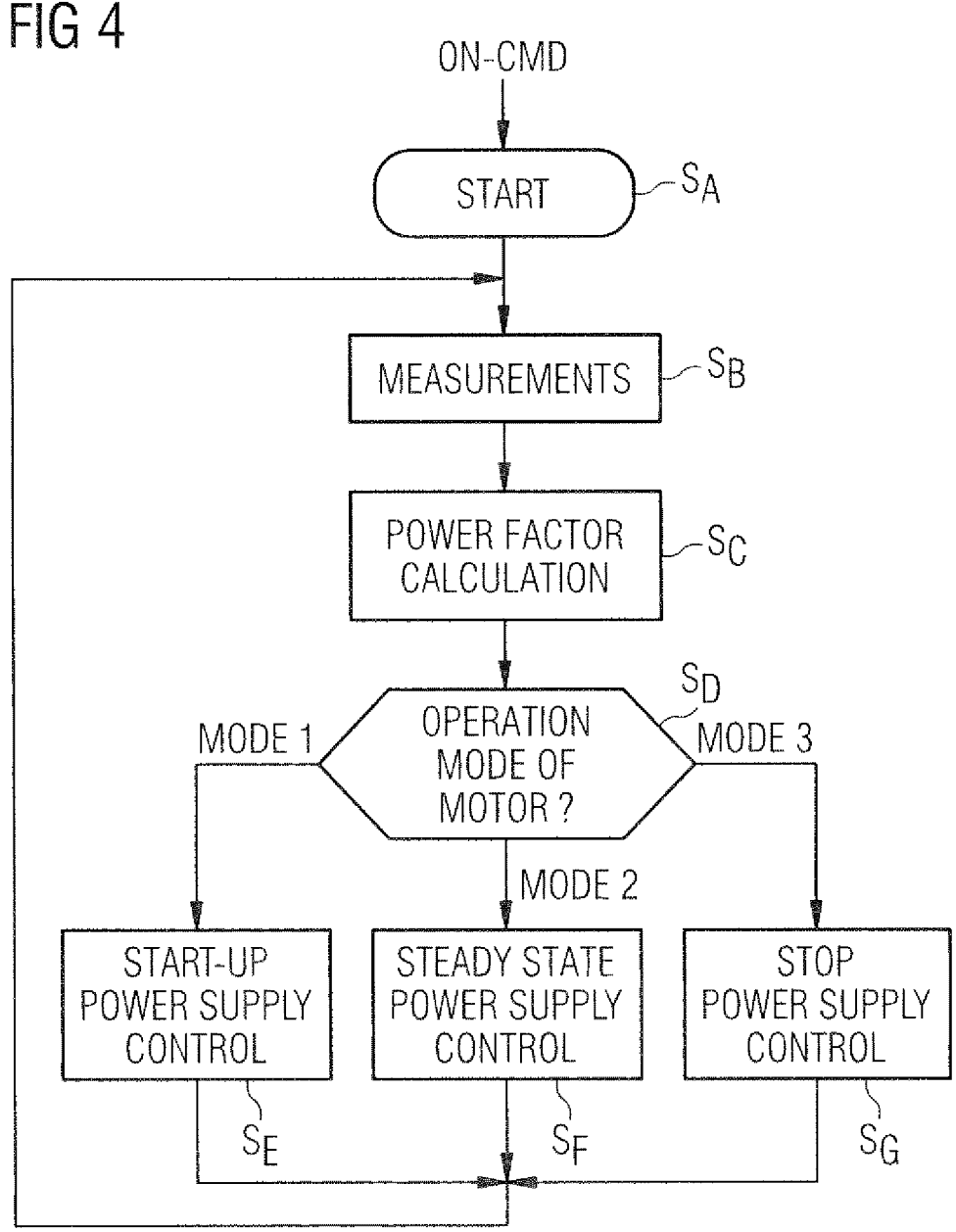
FIG. 4 shows a flowchart for illustrating a possible exemplary embodiment of a load control apparatus according to the first aspect of the present invention.

FIG. 4 shows a flowchart to illustrate a possible exemplary embodiment of the operation of a load control apparatus 1 according to the present invention. In response to an on-command, the connected electrical load is a motor M which is started in step $S_A$ and a transition is performed from the idle operation mode to the start operation mode.

In a first step $S_B$, measurements are performed by sensor components. For each phase L, the respective voltage U and an electrical load current $I_L$ can be measured in step $S_B$. The load current $I_L$ is measured by a sensor component 7 and the supply voltage U can be measured by the sensor component 9 of the load control apparatus 1.

In a further step $S_C$, a power factor calculation is performed by the processor 8A of the control unit 8. The processor 8A of the control unit 8 is adapted to calculate the power factor cos φ on the basis of the load current profile data and the supply voltage profile data stored in the data memory 8B of the control unit 8. The power factor is defined as a ratio of real power to apparent power. As power is transferred along a transmission line it does not consist purely of real power that can do work once transferred to the electrical motor M but rather consists of a combination of real and reactive power called apparent power. The power factor describes the amount of real power transmitted along a transmission line to the connected electrical load relative to the total apparent power flowing in the transmission line.

In a further step $S_D$, the current operation mode of the electrical motor M is observed. If the started electrical motor M is in the start-up operation mode (mode 1), the processor or FPGA 8A or controller of the control unit 8 performs a start-up power supply control in step $S_E$. If the electrical motor M is in the steady-state operation mode (mode 2), the processor or FPGA 8A of the control unit 8 performs a steady-state power supply control in step $S_F$. If the connected electrical motor M is in the stop operation mode (mode 3), the processor or FPGA 8A or controller of the control unit 8 performs a stop power supply control in step $S_G$ as illustrated in FIG. 4. In a possible implementation, the processor 8A of the control unit 8 can perform in step $S_E$, $S_F$, $S_G$ a phase angle control depending on the power factor cos φ calculated in step $S_C$ and the observed current operation mode of the electrical motor M.

A phase angle control (also called phase-fired control PFC) is used for power limiting the applied AC voltage. In a possible embodiment, the control unit 8 operates the power switch 5 to perform phase angle control. The relation between the load current $I_L$ and the supply voltage can be varied by the control unit 8 by controlling the switching of the power switch 5 via the driver circuit 6. In a possible embodiment, the control unit 8 can perform a load soft start procedure to temporarily reduce the mechanical load and torque in the power train to minimize an electrical current surge of an electrical load during a start-up. In this way, the control unit 8 may reduce the mechanical stress of the electrical load. The control unit 8 can control in a possible embodiment the three-phase voltage supply of a load during a start-up phase. In this way, the equipment of an electrical load such as a motor can be accelerated smoothly. This lengthens the service lifetime of the electrical load and improves its operation behavior. The control unit 8 can use the solid-state power switch 5 to control the electrical current flow and consequently the voltage applied to the electrical load depending on the calculated power factor and the operation mode and/or type of the electrical load.

Figure 8:
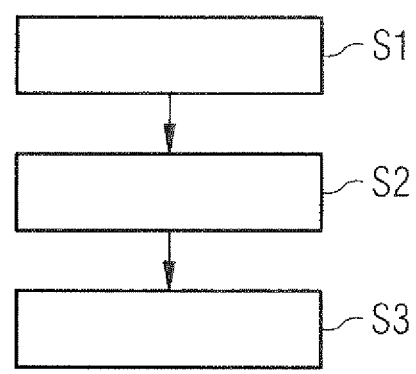
FIG. 8 shows a flowchart for illustrating a possible exemplary embodiment of a method for controlling a power supply to an electrical load according to a further aspect of the present invention.

FIG. 8 shows a flowchart of a possible exemplary embodiment of a method for controlling a power supply to an electrical load according to a further aspect of the present invention.

In the illustrated embodiment of FIG. 8, the method comprises three main steps S1, S2, S3. In a first step S1, a voltage drop $\Delta U_4$ at the sensor component 4 corresponding to a current rise speed of an electrical load current $I_L$ flowing via the sensor component 4 and the power switch 5 to an electrical load is generated. In a possible implementation, the voltage drop $\Delta U_4$ is generated by a coil corresponding to the current rise speed of the electrical load current $I_L$.

In a further step S2, the power switch 5 is automatically switched off by a driver circuit 6 within a switch-off period of less than one millisecond if the generated voltage drop $\Delta U_4$ plus a voltage drop $\Delta U_5$ along the power switch 5 exceeds a threshold voltage $U_{TH}$ to provide protection against an overcurrent, in particular protection against a short circuit current. In a possible embodiment the switch-off period is adjusted in a range between 2 microseconds and 1 millisecond.

In a further step S3, the electrical power applied to the electrical load is controlled by a control unit 8 on the basis of a measured load current profile and a measured supply voltage profile. The electrical power applied to the electrical load can be controlled in a possible embodiment by performing a phase angle control. In an alternative embodiment, the power supply control can be achieved by applying a predefined switching pattern to the power switch 5. The switching pattern can be stored in the data memory 8B of the control unit 8. Single half-waves can be selected to emulate a lower AC-frequency for the connected load. The switching pattern can e.g., be used to start a motor slowly and/or to limit the electrical load current.

Further, an overload state of the electrical load can be determined on the basis of the measured load current profile by the control unit 8 to trigger a switch-off by the driver circuit 6. In a possible embodiment, a type of the connected load is determined by the control unit 8 based on the measured profile data.

As can be seen from FIG. 2, the hardware sensor component 4 is connected in series with the power switch 5. The hardware sensor component 4 such as a coil is adapted to generate an electrical voltage corresponding to a current rise speed of the electrical current flowing via the sensor component 4 and the power switch 5 to the electrical load connected to the output terminal 3 of the load control apparatus 1. The driver circuit 6 is adapted to detect an occurring overcurrent, in particular a short circuit current, depending on the voltage drop generated directly by the sensor component 4 and to switch off the power switch 5 automatically upon detection of an overcurrent within a very short period of time to protect the connected electrical load. The sensor component 4 comprises in a possible implementation a coil which is adapted to generate directly an induction voltage $U_L$ depending on a change of the electrical current I flowing through the sensor component 4 and through the power switch 5 to the connected electrical load. The induction voltage $U_L$ generated by the coil 4 corresponds to the current rise speed dI/dt of an electrical current I flowing via the sensor component 4 and via the power switch 5 to the respective electrical load. The voltage drop $\Delta U_4$ generated by the sensor component 4 and the voltage drop $\Delta U_5$ along the power switch 5 can be applied as a sum voltage $U_\Sigma$ to the driver circuit 6. In an alternative embodiment the voltage drop $\Delta U_4$ generated by the sensor component 4 and the voltage drop $\Delta U_5$ can be applied separately to a common driver circuit 6 in parallel. In case that the power switch 5 is implemented by a MOSFET, the voltage drop $\Delta U_5$ along the power switch 5 corresponds to the drain source voltage $U_{DS}$. The sensor component 4 does not only measure the current rise speed dI/dt but also provides protection of the power switch 5 by limiting the voltage drop $\Delta U_5$, e.g., the drain source voltage $U_{DS}$ of the MOSFET 5. The driver circuit 6 can be adapted to determine based on the applied sum voltage $U_\Sigma$ an occurring short circuit current and/or an overload of the power switch 5 and/or an overload of the electrical load and is adapted to switch off the power switch 5 upon detection of an overcurrent and/or upon detection of an overload to protect both the connected electrical load and/or to protect the power switch 5 of the load control apparatus 1 within a short switch-off period of less than one millisecond, preferably less than five microseconds. In a preferred embodiment, the driver circuit 6 can switch off the power switch 5 within a switch-off period of less than two microseconds if the applied sum voltage $U_\Sigma$ exceeds a predetermined threshold voltage $U_{TH}$. In a possible implementation, the threshold voltage $U_{TH}$ can be configurable. If the applied sum voltage $U_\Sigma$ exceeds the configured threshold voltage $U_{TH}$, the driver circuit 6 of the load control apparatus 1 does switch off automatically the power switch 5 within a short switch-off period of less than one millisecond, preferably with a period of less than two to five microseconds. In a possible embodiment the switch-off period can be adjustable in a range between two microseconds and one millisecond. The switch-off is performed hardwired without involving the control unit 8. In a possible embodiment, the sensor component 4 comprises a coil adapted to measure the current rise speed dI/dt of the electrical current I flowing via the sensor component 4. The sensor component 4 generates directly an induction voltage $U_L$ proportional to the change of the electrical current (dI/dt) flowing through the coil 4. In a possible embodiment, if the electrical current I has a current rise speed of around five Ampere per microsecond, the generated induction voltage $U_L$ applied to the driver circuit 6 is sufficient to trigger a switch-off operation of the power switch 5 connected in series with the sensor component 4. The inductivity L of the coil 4 can be adapted individually to the physical limitations of the used power switch 5. The inductivity can also comprise a parasitic inductivity of the power switch 5. The hardware sensor component 4 is very robust against environmental influences and does not involve any electronic circuits to generate the sense voltage $\Delta U_4$. Consequently, the probability that the hardware sensor component 4 fails during operation of the load control apparatus 1 is very low.

In contrast to electronic circuits such as differentiators, the use of a hardware sensor component, in particular a coil, makes the load control apparatus 1 extremely robust and increases its operation lifetime. Switch-off operations are performed by the driver circuit 6 without involving the relative slow control unit 8. Accordingly, the switch-off operation triggered by the electrical voltage $\Delta U_4$ generated physically by the sensor component 4 is performed exclusively by hardware of the driver circuit 6 as illustrated also in the circuit diagram of FIG. 10. The sensor component 4 is very sensitive and generates a sense voltage $\Delta U_4$ even before the electrical load current $I_L$ flowing to the electrical load reaches a high current level which potentially can damage components of the connected electrical load. Accordingly, the load control apparatus 1 comprises a protection mechanism which is faster by at least a factor of about 50 than conventional protection devices. The very fast switch-off operation provided by the hardware driver circuit 6 does guarantee that only a small protection of electrical energy is transferred to the connected electrical load in case of an overcurrent or short current scenario. Accordingly, even sensitive electrical components of the connected electrical load are protected efficiently by the protection mechanism of the load control apparatus 1 according to the present invention. The protection mechanisms of the load control apparatus 1, i.e., the overcurrent protection circuit 1A and the overload protection circuit 1B, do not only protect the electrical components of the connected electrical load but also the power switch 5 integrated in the load control apparatus 1. Accordingly, the load control apparatus 1 according to the present invention has an integrated self-protection mechanism to provide self-protection of components integrated in the load control apparatus 1. The electrical power at the power switch 5 is limited in a possible implementation to around 80% of a predetermined operation power.

After the power switch 5 has been switched off, it is possible to switch on the power switch 5 again in case that predetermined switch-on conditions have been fulfilled. After a successful clearance of the switch-off cause, the power switch 5 can be switched on again. Consequently, the load control apparatus 1 according to the present invention can be used again after a switch-off has been triggered. In a possible implementation, the power switch 5 can be switched on again after a configurable wait period has expired and/or after successful clearance of a switch-off cause has been achieved.

In a possible implementation, the microprocessor or processor or FPGA 8A of the control unit 8 can calculate a current operation state of the power switch 5, in particular a current dissipation power and/or operation temperature T of the power switch 5. The control unit 8 can issue in a possible implementation a preemptive alarm in case that the monitored power of the power switch 5 or the temperature T of the power switch 5 does exceed admissible limits. The control unit 8 may observe a change of the power and temperature of the power switch 5 and can trigger a switch-off in case that a critical range has been reached.

The applied current phase L can comprise a frequency of e.g., 50 Hz or 60 Hz. In a possible embodiment, the sensor component 4 can comprise a coil with an inductivity L of less than 1 millihenry. The inductivity can also include the parasitic inductivity of the power switch 5.

In a possible embodiment, the processor or FPGA 8A of the control unit 8 is programmable and can make use of a program model of components implemented in the connected electrical load and/or implemented in the load control apparatus 1 itself. In a possible embodiment, model parameters of the employed model can be configured. These parameters can for instance comprise the normal operation current of the connected electrical load as well as a tripping class of the connected electrical load. In a possible embodiment, the control unit 8 is adapted to derive based on the current profiles measured by the current measurement component 7 and based on at least one parameter of the connected electrical load a temperature profile of components of the connected electrical load and/or of components of the load control apparatus 1 and may control the driver circuit 6 to switch off the power switch 5 if a deviation from a predetermined temperature range is detected. A parameter can e.g., comprise a set current or a tripping class of the connected electrical load. Further, the control unit 8 can be programmed with a configurable wait period. For instance, depending on the temperature profile, a corresponding wait period has to be expired before the power switch 5 can be switched on again. The driver circuit 6 can operate independently from the control unit 8 to switch off the associated power switch 5 within a brief reaction time in case that the applied sum voltage $U_\Sigma$ exceeds a configurable threshold voltage $U_{TH}$. The voltage drop $\Delta U_5$ along the power switch 5 corresponds to the amplitude or level of the flowing electrical current. The voltage drop $\Delta U_4$ along the sensor component 4 corresponds to the current rise speed of the electrical current flowing via the sensor component 4 and the power switch 5 to the electrical load. In critical operation states, both voltage drops $\Delta U_4$, $\Delta U_5$ are added and applied as a sum voltage $U_\Sigma$ to the driver circuit 6 so that a critical operation state can already be detected in an initial phase of its occurrence. The application of a sum voltage $U_\Sigma$ to the integrated driver circuit chip 6 is illustrated in the circuit diagram of FIGS. 9, 10 requires only one input pin of this chip, thus promoting miniaturization of the load control apparatus 1.

The driver circuit 6 can control an associated power switch 5 which can comprise in a possible implementation a gallium nitride MOSFET having a high voltage endurance of at least 800 Volts in the switch-off state and having a low impedance in its switch-on state. In further possible implementations, the power switch 5 can also comprise a SiC power MOSFET or a SiAlN MOSFET.

Figure 11:
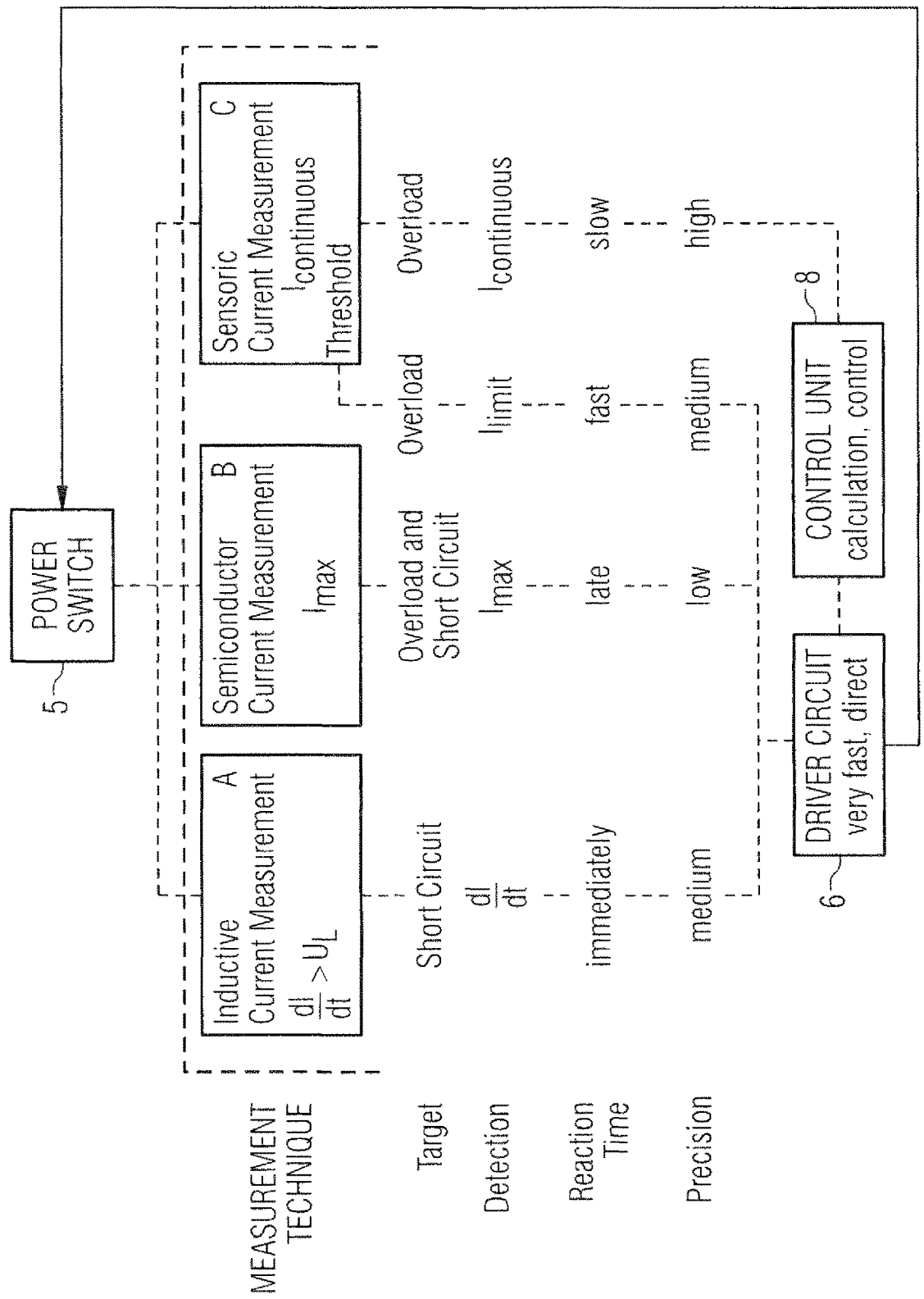
FIG. 11 shows schematically possible different redundant measurement and protection mechanisms employed by a method and apparatus according to the present invention.

As also illustrated in FIG. 11, the load control apparatus 1 can comprise several redundant protection mechanisms using different measurement techniques.

The load control apparatus 1 can comprise several protection mechanisms, in particular a first protection mechanism provided by the voltage drop $\Delta U_4$ along the sensor component 4, a second protection mechanism provided by the voltage drop $\Delta U_5$ along the power switch 5 and a third protection mechanism provided by the current measurement component 7. In case of a short circuit current, the sensor component 4 and the power switch 5 trigger the driver circuit 6 to perform a very fast switch-off operation. The current measurement component 7 further provides protection in case of overload. Accordingly, the load control apparatus 1 not only provides control of a power supply to an electrical load but also an electronic overload and overcurrent protection which can be used again after the power switch 5 has been switched off, in particular after a programmable wait period has expired.

FIG. 9 shows a circuit diagram for illustrating a possible exemplary implementation of a load control apparatus 1 providing switching and/or protection of an electrical load connected to the load control apparatus 1. In the illustrated implementation, the load control apparatus 1 comprises an input terminal 2 to receive a phase supply voltage U from a power supply network PSN having e.g., a voltage of 400 Volts. In the illustrated exemplary embodiment, each signal path from the input terminal 2 to the output terminal 3 comprises pairs of power switches 5 and associated sensor components 4. The illustrated circuit of FIG. 9 is symmetrical for positive current half-waves and negative current half-waves of an AC current supplied to the load control apparatus 1. Between the input terminal 2 and the output terminal 3 of the load control apparatus 1, a first coil 4-1 and a second coil 4-2 are provided. Each coil 4-1, 4-2 comprises an associated power switch 5-1, 5-2 as illustrated in the circuit diagram of FIG. 9. In the illustrated exemplary implementation, both coils 4-1, 4-2 have an inductivity L of 2.2 microhenry. In the illustrated implementation, the power switches 5-1, 5-2 are implemented by power MOSFETs. A varistor VAR can be provided in a possible implementation to eliminate disturbances. In the illustrated implementation, diodes D can be connected in parallel to each coil 4-1, 4-2 to reduce self-induction. The power switches 5-1, 5-2 are connected to a bridge rectifier circuit comprising in the illustrated implementation two pairs of complementary transistors Q1 to Q4. At the output side of the bridge rectifier circuit, capacitors C can be provided to provide a predetermined minimal delay. The delay has an influence on the switch-off period. In a possible embodiment the delay can be adjusted by changing the capacity of the capacitor C thus adjusting the switch-off period to the requirements of the use case, e.g., in a range between two microseconds and one millisecond. Both resistors R1, R2 comprise a resistance which can be configured to adjust the sensitivity of the circuit illustrated in FIG. 9. As can be seen in FIG. 9, the driver circuit 6 is connected to the output of the bridge rectifier circuit to receive the sum voltage $U_\Sigma$ of power switch 5-1 or power switch 5-2 and sensor component 4-1 or sensor component 4-2 and to apply in return control voltages on the gates of the two illustrated power switches 5-1, 5-2. The driver circuit 6 is adapted to detect an occurring overcurrent, in particular a short circuit current, depending on the voltages generated directly by the sensor component 4-1 or the sensor component 4-2 and to switch off the associated power switch 5-1 or power switch 5-2 upon detection of a short circuit current flowing through the current path between input terminal 2 and output terminal 3 within a period of time, in particular within a very short switch-off period of less than two to five microseconds, to protect the electrical load connected to the output terminal 3 of the load control apparatus 1.

FIG. 10 shows a block diagram of a possible exemplary embodiment of a driver circuit 6 which can be used in the load control apparatus 1 according to the present invention. In the illustrated exemplary embodiment, the driver circuit 6 comprises a single IGBT driver ICIED020/12-B2 manufactured by Infineon Technologies. Other driver circuits may also be used, in partial an ASIC. As can be seen from the block diagram of FIG. 10, the driver circuit 6 comprises two separated circuit halves galvanically separated by transformers T1, T2. The left side of the driver circuit 6 illustrated in FIG. 10 is connected to the control unit 8 to receive control signals from the control unit 8, in particular in response to control commands or depending on measured current profiles. The low voltage side on the left side of the driver circuit 6 of the circuit diagram as shown in FIG. 10 is connected via transformers to the high voltage side provided on the right side of the illustrated circuit of FIG. 10. The sum voltage $U_\Sigma$ consisting of the voltage drop $\Delta U_4$ along the sensor component 4 and the voltage drop $\Delta U_5$ along the power switch 5 is applied in the illustrated implementation to the DESAT input pin of the driver circuit 6 and is compared by a comparator K3 of the driver circuit 6 with a configurable threshold voltage $U_{TH}$ of e.g., 9 Volts as illustrated in FIG. 10. If the configurable threshold voltage $U_{TH}$ is exceeded, a binary signal travels through several gates to drive an operational amplifier and to generate a control switch-off signal output to the gates of the power MOSFETs 5-1, 5-2 to switch both power MOSFETs off within a very short reaction time of less than two to five microseconds. The signal propagation delays caused by the gates and the capacitor of the driver circuit 6 define a minimal switch-off period. The driver circuit 6 illustrated in FIG. 10 comprises two galvanically separated parts. The driver circuit 6 can be connected to a standard 5 Volt DSP or microcontroller 8A forming part of the control unit 8 wherein CMOS inputs/outputs are connected to the low voltage side. As can be seen from the circuit diagram of FIG. 10, a switch-off loop used to switch off the power switches 5-1, 5-2 in response to the applied sum voltage $U_\Sigma$ is provided only at the high voltage side of the driver circuit 6 so that the reaction time is very short because of the small propagation times of the logical signals propagating via the logical gates of the high voltage part of the driver circuit 6. The switch-off protection loop does not include the control unit 8 which is mostly used for normal switching and/or switching-off operations in response to receive switched-on/switched-off commands CMD and is also used for the power supply control of the electrical power flowing to the connected electrical load, in particular during a soft start up. In a possible implementation, the sensor component 4 and the power switch 5 as well as the driver circuit 6 can be provided on a common printed circuit board.

In a possible implementation, the sensor component 4 can be implemented by another component than a coil, in particular by a resistor with a corresponding local measurement circuit adapted to generate directly an electrical voltage U corresponding to the current rise speed of the electrical current I flowing through the respective sense resistor. The resistor can be an NTC or PTC resistor. In a possible embodiment, the resistance of the used resistor 4 can be temperature-dependent. Also, the temperature-dependent resistance can be configured individually to the physical limitations of the associated power switch 5.

In a further embodiment, a data model of the connected electrical load can be stored in a memory and evaluated by the processor or FPGA 8A of the control unit 8 to provide overload and/or overcurrent protection to the connected electrical load. The load control apparatus 1 can comprise an output interface 13 adapted to signal a current operation state of the load control apparatus 1, in particular of its integrated power switches 5. In a possible implementation, the output interface 13 can also indicate what safety mechanism or protection mechanism has been triggered by the switching-off of the integrated power switches 5. In this implementation, a user or operator of an automation system can be informed whether the switching-off of the power switch 5 was caused by a detected high current rise speed of the electrical current or because of a determined or detected overload of the power switch 5 or detected overload of the connected electrical load or caused by an overload detection in view of the current profiles measured by the current measurement component 7. In a still further possible embodiment, information about the cause of the switching-off of the power switch 5 can also be output via a data interface of the load control apparatus 1, for instance to a remote controller of an automation system including the protected electrical load connected to the output terminal 3 of the load control apparatus 1. In a still further possible implementation, the load control apparatus 1 can comprise a local data memory to store log data. The log data can comprise data about switch-off operations performed during operation of the automation system or during operation of the connected electrical load. In a possible implementation, the memorized log data can be evaluated to analyze critical operation states having occurred during operation of the automation system.

In a still further possible embodiment, a relay circuit 14 can be connected in series with the power switch 5. The relay circuits 14 for different phases can use the change or sequence of power supply phases and/or provide a galvanic separation. During a switch-off operation controlled by the driver circuit 6 or by the control unit 8, the power switch 5 can be switched off before the associated relay circuit 14, whereas during a switch-on operation under control of the driver circuit 6 or under control of the control unit 8 the relay circuit 14 is switched on before the associated power switch 5. This does minimize the contact wear of the relay circuit 14 and increase the safety against failure of the power switch 5. Further, the switch-on and switch-off sequences make it possible to detect failures of the power switch 5.

In a still further possible embodiment of the load control apparatus 1 according to the first aspect of the present invention, different models and/or load operation characteristics for different electrical loads can be uploaded to a configuration memory of the control unit 8 to provide matching load protection for the respective electrical load depending on the measured current profiles and/or voltage profiles and depending on at least one parameter of the connected electrical load. In a possible implementation, these data models can be downloaded from a central database connected to the control unit 8 via a data network. Depending on the type of the connected electrical load, different corresponding data models and/or load operation characteristics can be loaded into the configuration memory of the control unit 8 and can be evaluated in view of the measured current and/or voltage profiles provided by the measurement components.

FIG. 11 shows schematically the operation architecture of the load control apparatus 1 comprising redundant protection mechanisms and different measurement techniques to provide overload and/or overcurrent protection of the load control apparatus 1 itself, in particular its power switches 5, and also for the electrical load connected to the load control apparatus 1. Different redundant protection mechanisms differ in what they detect ($dI/dt$, $I_{max}$, $I_{limit}$, $I_{continuous}$), their respective reaction times and the measurement precision as also illustrated in FIG. 11. Even if one protection mechanism may fail another protection mechanism of the load control apparatus 1 can still be applied.

The load control apparatus 1 according to the present invention provides for an optimized start operation and switch-off of a connected electrical load. Further, the wearout of the connected electrical load during the different operation phases or states is minimized to maximize the operation lifetime of the electrical load.

A type of connected load can be selected by a user by means of the user interface 15. A user may select from a displayed group of possible loads the currently connected load, e.g., whether the load is an inductive load, a capacitive load or a resistive load. A corresponding operation parameter characteristic is then activated in the memory 8C and loaded by the processor 8A to provide overcurrent and/or overload protection for the selected type of load. In a menu displayed on the output interface or screen 13 of the user interface 15 the user may also select subtypes of inductive, capacitive or resistive loads to activate the corresponding fitting operation parameter characteristic. The user interface 15 can also be integrated in a portable device having a wireless connection with the control unit 8. The switch-off period may also be adjusted within a predefined range by means of the user interface 15. In a system a plurality of loads can be connected by means of an association load control apparatus 1 as shown in FIGS. 1, 2. The system may comprise busbars connected to the input terminal 2 of the load control apparatus 1. The control units 8 of the different load control apparatus 1 can in a possible embodiment communicate with each other via the busbars by power line communication PLC. The user interface 15 can comprise a touch screen. The user interface 15 can be used to signal different operation states and/or faults to a user. Different kinds of warning signals can be displayed, in particular a warning concerning a too low supply voltage or a too high supply voltage. The user can also be warned against an unsymmetrical power supply or against missing supply voltage phases. The user interface 15 can also display operation modes of the connected load, e.g., whether a motor is currently started or stopped or in a steady state operation mode. Other parameters can be displayed as well, e.g., the calculated power factor. Further the currently activated operation parameter characteristic can be displayed to the user.

In a possible embodiment the load control apparatus 1 can be integrated in a housing having an electrical contact provided for connection of the at least one input terminal 2 with a busbar of a busbar system.

In a still further possible embodiment, the load control apparatus 1 can be integrated in a fuse housing and be used to substitute a connected fuse received in a fuse holder of an electronic circuit. In a possible implementation the load control apparatus 1 is integrated in a NH-fuse housing.

In a possible embodiment the switch-off period of load control apparatus 1 is adjustable in a range between two microseconds and one millisecond. This switch-off period can be predefined by the hardware circuitry. In a possible embodiment the switch-off period can be adjusted in response to a user input command at input interface 12 of the user interface 15 which may change e.g., the capacitance of the capacitor C in FIG. 9 to cause a change of the signal propagation delay of the signal supplied to the driver circuit 6.

Further embodiments are possible. The load characteristics memory 8C can be integrated in an exchangeable data carrier inserted into a receiving slot in the housing of the load control apparatus 1.

The sequence of components 4, 5, 7, 11 in the signal path shown in the block diagram of FIG. 2 can vary. Further redundant components can be provided, e.g., at least two coils 4 and/or two power switches 5 connected in parallel. Also, some components may not be integrated in the housing of the load control apparatus 1 but can form external components.

The control unit 8 can determine in a possible embodiment an asymmetry of the supplied voltage phases applied to input terminal 2. If the detected difference between supply voltages L1, L2, L3 exceeds a certain threshold a warning signal can be output via output interface 13 of the user interface 15 and/or a switch-off can be triggered by the control unit 8. Further the sensor component 9 can be used to detect a too low or a too high supply voltage for the load triggering automatically a switch-off by the control unit 8.

The sensor components can also be used to perform an isolation measurement of the load (e.g., winding of a motor M to housing) or whether an element of the load control apparatus 1 is faulty (e.g., the power switch 5).

The load control apparatus 1 can be a stand-alone device or integrated into other entities. In a possible embodiment the load control apparatus 1 is integrated in the housing of the load. The load control apparatus 1 can also be integrated in a plug device pluggable into a socket of the load device housing. It may also be integrated in an intermediate device such as a variable frequency controller provided between the power supply network PSN and the load.

The load control apparatus 1 can be connected at its input terminal 2 to a busbar of a busbar system either directly or indirectly by means of an adapter device. The load control apparatus 1 can also be mounted directly or indirectly by means of an adapter to a DIN rail or to a top hat rail.

The invention claimed is:

1. A load control apparatus for controlling a power supply to an electrical load connected to an output terminal of the load control apparatus comprising:

an overcurrent protection circuit having at least one input terminal adapted to receive a supply voltage from a power supply network and having a power switch through which the connected electrical load receives an electrical load current and having a current rise speed sensor component connected in series with the power switch and adapted to generate directly a voltage drop corresponding to the current rise speed of the electrical load current flowing from the input terminal of the load control apparatus via the current rise speed sensor component and the power switch to the output terminal and having a driver circuit which comprises a low voltage side and a high voltage side, wherein the low voltage side of the driver circuit is connected to a control unit and the high voltage side of the driver circuit is connected to the power switch, wherein the driver circuit is adapted to detect an occurring overcurrent depending on the voltage drop generated by the current rise speed sensor component and/or depending on a non-linear voltage drop along the power switch applied to a drive input at the high voltage side of the driver circuit and wherein the driver circuit is adapted to switch off said power switch if a configurable threshold voltage is exceeded within a predefined switch-off period, said load control apparatus further comprising a power supply control circuit having a voltage sensor component adapted to measure at the input terminal the supply voltage notified by the voltage sensor component to the control unit of the load control apparatus to provide a supply voltage profile stored in a data memory of the load control unit, wherein the control unit is adapted to control an electrical power supplied to the connected electrical load depending on the supply voltage profile and depending on a load current profile stored in the data memory of the control unit.

2. The load control apparatus according to claim 1 wherein the electrical power supplied to the connected electrical load is controlled by the control unit depending on the determined type of the connected electrical load, wherein the type of the electrical load comprises a resistive, inductive or capacitive load type.

3. The load control apparatus according to claim 1 further comprising:

an overload protection circuit having a load current sensor component adapted to measure continuously the load current flowing to the output terminal, wherein the measured load current is notified by the load current sensor component to the control unit of the load control apparatus to provide the measured load current profile stored in the data memory of the control unit.

4. The load control apparatus according to claim 1 wherein the current rise speed sensor component of the overcurrent protection circuit comprises a coil which is adapted to generate an induction voltage drop depending on the current rise speed of the load current flowing through the current rise speed sensor component of the overcurrent protection circuit.

5. The load control apparatus according to claim 1 wherein the voltage sensor component is formed by a voltage divider adapted to supply a fraction of the supply voltage at the input terminal to the control unit of the load control apparatus to provide the supply voltage profile stored in the data memory of the control unit.

6. The load control apparatus according to claim 1 wherein the control unit is adapted to control the driver circuit of the load control apparatus on reception of a control command such that the power switch is switched either on or off according to the received control command, wherein the control unit of the load control apparatus is adapted to receive the control command from a user interface of the load control apparatus, from a computer connected to said load control apparatus or from a stored program control of an automation system.

7. The load control apparatus according to claim 1 wherein the control unit of the load control apparatus is adapted to derive based on at least one operation parameter of the connected electrical load and the stored profile data a temperature profile of components of the electrical load or of components of the load control apparatus and to control the driver circuit to switch off the power switch if a deviation from a predetermined temperature range is detected.

8. The load control apparatus according to claim 1 wherein the power switch is switched on after a configurable wait period or after successful clearance of a switch-off cause or if other predetermined switch-on conditions are fulfilled.

9. The load control apparatus according to claim 1 comprising different input terminals provided for different phases of the power supply network, wherein each input terminal is connected via a signal path to an output terminal, wherein each signal path comprises pairs of power switches and associated current rise speed sensor components.

10. The load control apparatus according to claim 1 wherein the low voltage side and the high voltage side of the driver circuit are galvanically separated from each other by transformers.

11. The load control apparatus according to claim 1 wherein the processor or FPGA of the control unit has access to at least one load operation characteristic of the connected electrical load stored in a load characteristic memory of the control unit indicating for operation parameters at least one admissible operation zone, at least one critical operation zone and/or at least one inadmissible operation zone, wherein the operation parameters comprise as a first operation parameter a ratio between a load current and a rated current of the connected electrical load and as a second operation parameter time.

12. The load control apparatus according to claim 1, wherein the current rise speed sensor component comprises an inductivity of less than 1 millihenry.

13. The load control apparatus according to claim 1 wherein the sum voltage applied to the drive input at the high voltage side of the driver circuit is compared by a comparator at the high voltage side of the driver circuit with the configurable threshold voltage.

14. The load control apparatus according to claim 3 wherein the control unit is adapted to control the driver circuit to switch-off the power switch if an overload state of the connected electrical load is determined by the control unit or to control an electromechanical relay connected in series with the power switch to interrupt the current flow if an overload state of the connected electrical load is determined by the control unit.

15. The load control apparatus according to claim 3 wherein the load current sensor component of the overload protection circuit comprises a Hall sensor, a GMR sensor, a shunt resistor or a transformer adapted to measure continuously the load current flowing to the output terminal of the load control apparatus to provide the load current profile.

16. The load control apparatus according to claim 3 wherein the load current sensor component of the overload protection circuit and the voltage sensor component of the power supply control circuit are connected to associated analog-to-digital converters adapted to convert the measured analog load current profile and the measured supply voltage profile into corresponding measurement values stored in the data memory of the control unit as load current profile data and supply voltage profile data.

17. The load control apparatus according to claim 9 wherein the pair of power switches provided in the signal path between the input terminal and the output terminal comprises a first power switch provided for a positive current half-wave of an AC current and a second power switch is provided for a negative current half-wave of an AC current.

18. The load control apparatus according to claim 9 wherein the control unit of the load control apparatus is adapted to determine whether the received supply voltages at the different input terminals or load currents provided for different phases at different output terminals indicate a symmetrical power supply of the connected load by the power supply network connected to the input terminals of the load control apparatus on the basis of the supply voltage profile data stored in the data memory of the control unit and wherein the control unit of the load control apparatus is adapted to determine whether a load is connected to the output terminal on the basis of the profile data stored in the data memory of the control unit, wherein the control unit is adapted to switch off automatically the power switches if an unsymmetrical power supply of the load control apparatus by the power supply network or an unsymmetrical power supply of the load by the load control apparatus is recognized by the control unit.

19. The load control apparatus according to claim 11 wherein the processor or FPGA of the control unit is adapted to evaluate the load current profile data and/or the supply voltage profile data stored in the data memory of the control unit with respect to the load operation characteristics of the electrical load stored in the load characteristic memory to determine whether operation parameter combinations of different operation parameters are in a critical or inadmissible operation zone of the load operation characteristic.

20. The load control apparatus according to claim 13 wherein the switch-off period is defined by propagation times of logical signals propagating via a comparator and logical gates of the high voltage side of the driver circuit and by a capacity of a capacitor, wherein the logical gates of the high voltage side of the driver circuit are provided to combine control signals received at the low voltage side of the driver circuit from the control unit with the sum voltage applied to the drive input at the high voltage side of the driver circuit.

21. The load control apparatus according to claim 16 wherein a processor or FPGA of the control unit is adapted to calculate a power factor on the basis of the load current profile data and the supply voltage profile data stored in the data memory of the control unit.

22. The load control apparatus according to claim 16 wherein the control unit is adapted to perform a phase angle control and/or to apply a predefined switching pattern to the power switch depending on a calculated power factor.

23. The load control apparatus according to claim 19 wherein the control unit outputs a warning signal via an output interface of a user interface of the load control apparatus if an operation parameter combination of the operation parameters is determined to be in a critical operation zone of a load operation characteristic of the electrical load, wherein the control unit generates automatically a switch-off control signal applied to the power switch to switch off the load current if an operation parameter combination of operation parameters is determined to be in an inadmissible operation zone of a load operation characteristic of the electrical load.

24. An automation system comprising at least one load control apparatus used for controlling a power supply to at least one electrical load connected to output terminals of the load control apparatus, said load control apparatus comprising:

an overcurrent protection circuit having at least one input terminal adapted to receive a supply voltage from a power supply network and having a power switch through which the connected electrical load receives an electrical load current and having a current rise speed sensor component connected in series with the power switch and adapted to generate directly a voltage drop corresponding to the current rise speed of the electrical load current flowing from the input terminal of the load control apparatus via the current rise speed sensor component and the power switch to the output terminal and having a driver circuit which comprises a low voltage side and a high voltage side, wherein the low voltage side of the driver circuit is connected to a control unit and the high voltage side of the driver circuit is connected to the power switch, wherein the driver circuit is adapted to detect an occurring overcurrent depending on the voltage drop generated by the current rise speed sensor component and/or depending on a non-linear voltage drop along the power switch applied to a driver input at the high voltage side of the driver circuit, wherein the driver circuit is adapted to switch off said power switch if a configurable threshold voltage is exceeded within a predefined switch-off period, said load control apparatus further comprising a power supply control circuit having a voltage sensor component adapted to measure at the input terminal the supply voltage notified by the voltage sensor component to the control unit of the load control apparatus to provide a supply voltage profile stored in a data memory of the load control unit, wherein the control unit is adapted to control an electrical power supplied to the connected electrical load depending on the supply voltage profile and depending on a load current profile stored in the data memory of the control unit, said automation system further comprising at least one an electrical load connected to the output terminals of the load control apparatus of said automation system.

25. An electrical load comprising an integrated load control apparatus, said integrated load control apparatus comprising:

an overcurrent protection circuit having at least one in-put terminal adapted to receive a supply voltage from a power supply network and having a power switch through which the connected electrical load receives an electrical load current and having a current rise speed sensor component connected in series with the power switch and adapted to generate directly a voltage drop corresponding to the current rise speed of the electrical load current flowing from the input terminal of the load control apparatus via the current rise speed sensor component and the power switch to the output terminal and having a driver circuit which comprises a low voltage side and a high voltage side, wherein the low voltage side of the driver circuit is connected to a control unit and the high voltage side of the driver circuit is connected to the power switch, wherein the driver circuit is adapted to detect an occurring overcurrent depending on the voltage drop generated by the current rise speed sensor component and/or depending on a non-linear voltage drop along the power switch applied to a driver input at the high voltage side of the driver circuit, wherein the driver circuit is adapted to switch off said power switch if a configurable threshold voltage is exceeded within a predefined switch-off period, said integrated load control apparatus further comprising a power supply control circuit having a voltage sensor component adapted to measure at the input terminal the supply voltage notified by the voltage sensor component to the control unit of the load control apparatus to provide a supply voltage profile stored in a data memory of the load control unit, wherein the control unit is adapted to control an electrical power supplied to the connected electrical load depending on the supply voltage profile and depending on a load current profile stored in the data memory of the control unit.

26. A busbar system comprising busbars to which at least one load control apparatus is connected, wherein the control apparatus comprises an overcurrent protection circuit having at least one input terminal adapted to receive a supply voltage from a power supply network and having a power switch through which the connected electrical load receives an electrical load current and having a current rise speed sensor component connected in series with the power switch and adapted to generate directly a voltage drop corresponding to the current rise speed of the electrical load current flowing from the input terminal of the load control apparatus via the current rise speed sensor component and the power switch to the output terminal and having a driver circuit which comprises a low voltage side and a high voltage side, wherein the low voltage side of the driver circuit is connected to a control unit and the high voltage side of the driver circuit is connected to the power switch, wherein the driver circuit is adapted to detect an occurring overcurrent depending on the voltage drop generated by the current rise speed sensor component and/or depending on a non-linear voltage drop along the power switch applied to a drive input at the high voltage side of the driver circuit, wherein the driver circuit is adapted to switch off said power switch if a configurable threshold voltage is exceeded within a predefined switch-off period, said load control apparatus of said busbar system further comprising a power supply control circuit having a voltage sensor component adapted to measure at the input terminal the supply voltage notified by the voltage sensor component to the control unit of the load control apparatus to provide a supply voltage profile stored in a data memory of the load control unit, wherein the control unit is adapted to control an electrical power supplied to the connected electrical load depending on the supply voltage profile and depending on a load current profile stored in the data memory of the control unit.

27. A fuse housing comprising an integrated load control apparatus, said integrated load control apparatus comprising an overcurrent protection circuit having at least one in-put terminal adapted to receive a supply voltage from a power supply network and having a power switch through which the connected electrical load receives an electrical load current and having a current rise speed sensor component connected in series with the power switch and adapted to generate directly a voltage drop corresponding to the current rise speed of the electrical load current flowing from the input terminal of the load control apparatus via the current rise speed sensor component and the power switch to the output terminal and having a driver circuit which comprises a low voltage side and a high voltage side, wherein the low voltage side of the driver circuit is connected to a control unit and the high voltage side of the driver circuit is connected to the power switch, wherein the driver circuit is adapted to detect an occurring overcurrent depending on the voltage drop generated by the current rise speed sensor component and/or depending on a non-linear voltage drop along the power switch applied to a driver input at the high voltage side of the driver circuit, wherein the driver circuit is adapted to switch off said power switch if a configurable threshold voltage is exceeded within a predefined switch-off period, said integrated load control apparatus further comprising a power supply control circuit having a voltage sensor component adapted to measure at the input terminal the supply voltage notified by the voltage sensor component to the control unit of the load control apparatus to provide a supply voltage profile stored in a data memory of the load control unit, wherein the control unit is adapted to control an electrical power supplied to the connected electrical load depending on the supply voltage profile and depending on a load current profile stored in the data memory of the control unit.

\* \* \* \* \*